United States Patent
Funaki et al.

(10) Patent No.: US 11,102,410 B2
(45) Date of Patent: Aug. 24, 2021

(54) CAMERA PARAMETER SETTING SYSTEM AND CAMERA PARAMETER SETTING METHOD

(71) Applicant: PANASONIC I-PRO SENSING SOLUTIONS CO., LTD., Fukuoka (JP)

(72) Inventors: Toshimasa Funaki, Saga (JP); Hiroaki Jodan, Fukuoka (JP); Toshihiro Fujiki, Fukuoka (JP); Toshiyuki Sano, Fukuoka (JP); Naoaki Tomisaka, Fukuoka (JP); Yuji Arima, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/885,929

(22) Filed: May 28, 2020

(65) Prior Publication Data
US 2020/0382705 A1 Dec. 3, 2020

(30) Foreign Application Priority Data
May 31, 2019 (JP) .............................. JP2019-103275

(51) Int. Cl.
*H04N 5/232* (2006.01)
*G06T 7/80* (2017.01)
(Continued)

(52) U.S. Cl.
CPC ..... *H04N 5/23245* (2013.01); *G06K 9/00798* (2013.01); *G06T 7/80* (2017.01);
(Continued)

(58) Field of Classification Search
CPC ......... H04N 5/23245; H04N 5/232939; H04N 5/23296; H04N 5/232; H04N 5/23216;
(Continued)

(56) References Cited

U.S. PATENT DOCUMENTS 5,479,206 A * 12/1995 Ueno ........................ H04N 1/38
348/211.5
5,938,717 A * 8/1999 Dunne ...................... G08G 1/04
701/117
(Continued)

FOREIGN PATENT DOCUMENTS

EP 2549738 A1 * 1/2013 ......... H04N 5/23212
EP 3340603 A1 * 6/2018 ............. G02B 7/285
(Continued)

*Primary Examiner* — David E Harvey
(74) *Attorney, Agent, or Firm* — Greenblum & Bernstein, P.L.C.

(57) ABSTRACT

In installation work, a camera captures a vehicle including an occupant and a license plate of the vehicle in a view angle from an installation position of the camera and transmits, to the terminal, a captured image of the occupant and a captured image of the license plate in response to a setting request from a terminal. The terminal displays a setting screen including the captured image of the occupant and the captured image of the license plate, receives input of parameters including an operation mode of the camera and positional relationship information indicating a positional relationship between the camera and the vehicle according to manipulations of an operator, and transmits the input parameters to the camera. The camera derives and sets camera parameters corresponding to the operation mode based on the input parameters transmitted from the terminal.

15 Claims, 25 Drawing Sheets

(51) Int. Cl.
   *G06K 9/00* (2006.01)
   *H04W 88/08* (2009.01)
(52) U.S. Cl.
   CPC ... *H04N 5/23296* (2013.01); *H04N 5/232939* (2018.08); *H04W 88/08* (2013.01); *G06K 2209/15* (2013.01); *G06T 2207/30252* (2013.01)
(58) Field of Classification Search
   CPC ....... G06T 7/80; H04W 88/08; G08G 1/0175; G08G 1/054; G06K 9/00798
   See application file for complete search history.

(56) References Cited

U.S. PATENT DOCUMENTS

| | | | | |
|---|---|---|---|---|
| 6,681,195 B1* | 1/2004 | Poland | | G01P 3/38 700/159 |
| 6,690,294 B1* | 2/2004 | Zierden | | G08G 1/052 340/933 |
| 7,463,304 B2* | 12/2008 | Murray | | G03B 17/00 348/211.4 |
| 7,760,908 B2* | 7/2010 | Curtner | | G08B 13/1968 382/103 |
| 8,830,299 B2* | 9/2014 | Osipov | | G08G 1/0175 348/36 |
| 9,025,028 B2* | 5/2015 | Mitic | | H04N 5/3454 348/148 |
| 9,247,215 B1* | 1/2016 | Athan | | G08B 13/1966 |
| 10,521,675 B2* | 12/2019 | Han | | H04N 9/8205 |
| 10,580,294 B2* | 3/2020 | Bedard | | G06Q 40/00 |
| 2003/0093805 A1* | 5/2003 | Gin | | G08B 13/19619 725/105 |
| 2004/0252193 A1* | 12/2004 | Higgins | | G08G 1/042 348/149 |
| 2006/0171453 A1* | 8/2006 | Rohlfing | | G08B 13/19656 375/240.01 |
| 2006/0221229 A1* | 10/2006 | Ogawa | | H04N 5/232 348/367 |
| 2008/0129844 A1* | 6/2008 | Cusack | | H04N 5/23229 348/241 |
| 2011/0267464 A1* | 11/2011 | Archer | | H04N 7/188 348/143 |
| 2013/0229517 A1* | 9/2013 | Kozitsky | | G06K 9/3258 348/148 |
| 2013/0335579 A1* | 12/2013 | Raghavan | | G06T 7/73 348/188 |
| 2015/0109438 A1* | 4/2015 | Matsuda | | H04N 21/2187 348/143 |
| 2015/0326791 A1* | 11/2015 | Stahl | | H04N 7/181 348/240.99 |
| 2016/0350921 A1* | 12/2016 | Bataller | | G06K 9/00771 |
| 2017/0098304 A1* | 4/2017 | Blais-Morin | | G06T 7/246 |
| 2017/0104915 A1* | 4/2017 | Adachi | | G06K 9/3233 |
| 2017/0195605 A1* | 7/2017 | Alves | | H04N 5/2327 |
| 2019/0050634 A1* | 2/2019 | Nerayoff | | G07B 15/00 |
| 2019/0052792 A1* | 2/2019 | Baba | | G06K 9/00832 |
| 2019/0068882 A1* | 2/2019 | Mok | | G06K 9/00624 |
| 2020/0372794 A1* | 11/2020 | Park | | G08G 1/054 |

FOREIGN PATENT DOCUMENTS

| | | | |
|---|---|---|---|
| JP | 2002216289 A | * | 8/2002 |
| JP | 2007-174016 | | 7/2007 |

\* cited by examiner

FIG. 5A

| ZOOM POSITION z | INFINITY | 10m | 5m | 3m | 1m |
|---|---|---|---|---|---|
| 0 | 0 (1) | 2 (3) | 4 (5) | 6 (7) | 8 (9) |
| 1 | 2 (3) | 5 (6) | 8 (9) | 11 (12) | 14 (15) |
| 2 | 3 (4) | 6 (7) | 9 (10) | 12 (13) | 15 (16) |
| 3 | 5 (6) | 8 (9) | 12 (13) | 15 (16) | 19 (20) |
| . | . | . | . | . | . |
| . | . | . | . | . | . |
| . | . | . | . | . | . |
| 1000 | 10 (11) | 30 (31) | 50 (51) | 70 (71) | 100 (101) |

PARENTHESIZED: VALUES IN NIGHTTIME MODE
UNPARENTHESIZED: VALUES IN DAYTIME MODE

FIG. 5B

| ZOOM POSITION z | SHOOTING ANGLE OF VIEW $\theta x$ |
|---|---|
| 0 | 90° |
| 1 | 89.7° |
| 2 | 89.5° |
| . | . |
| . | . |
| . | . |
| 1000 | 3° |

*FIG. 5C*

| DEVIATION ANGLE θp | PLF POSITION |
|---|---|
| 0° | 0 |
| 0.1° | 2 |
| 0.2° | 4 |
| . | . |
| . | . |
| . | . |
| 20° | 400 |

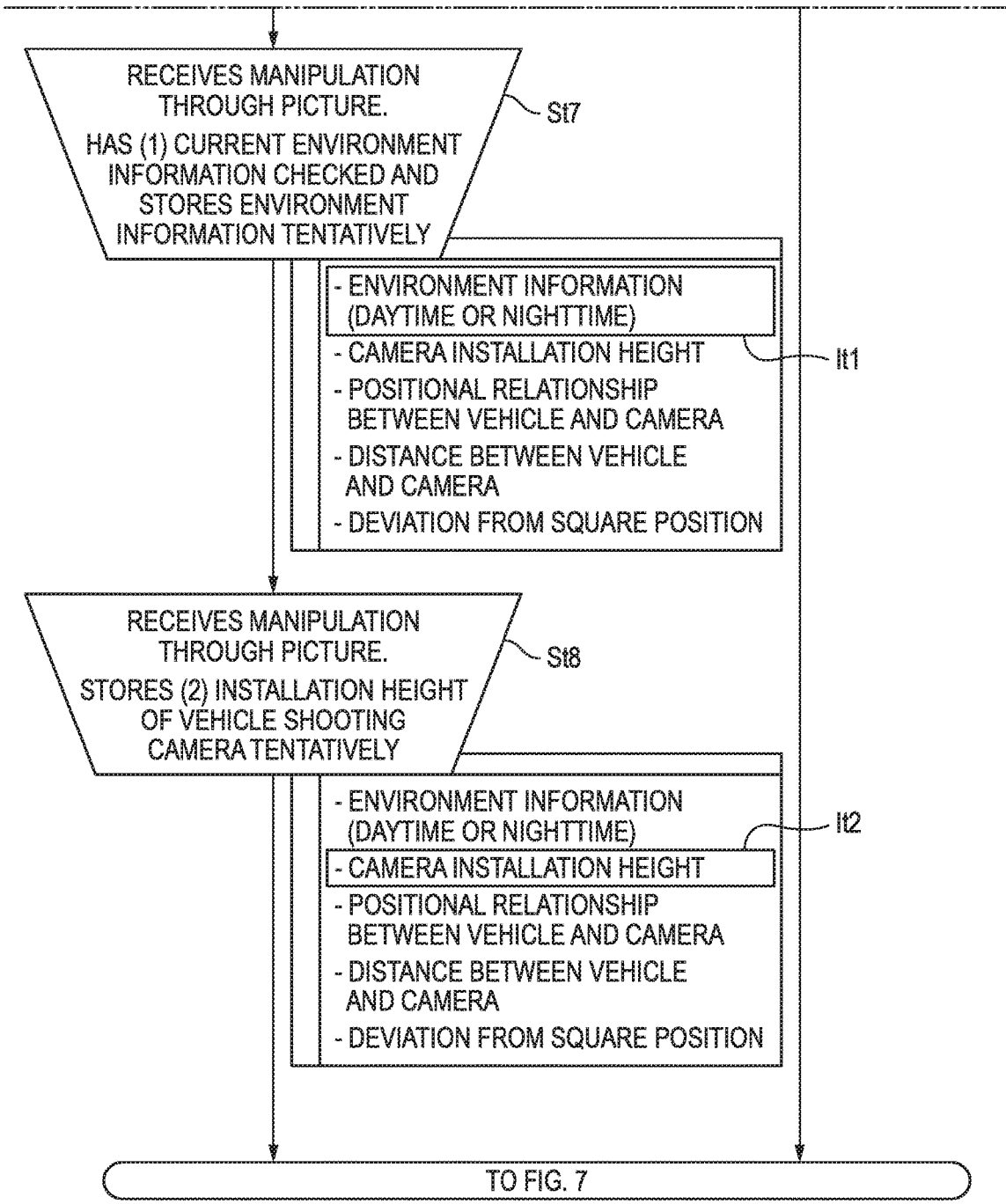

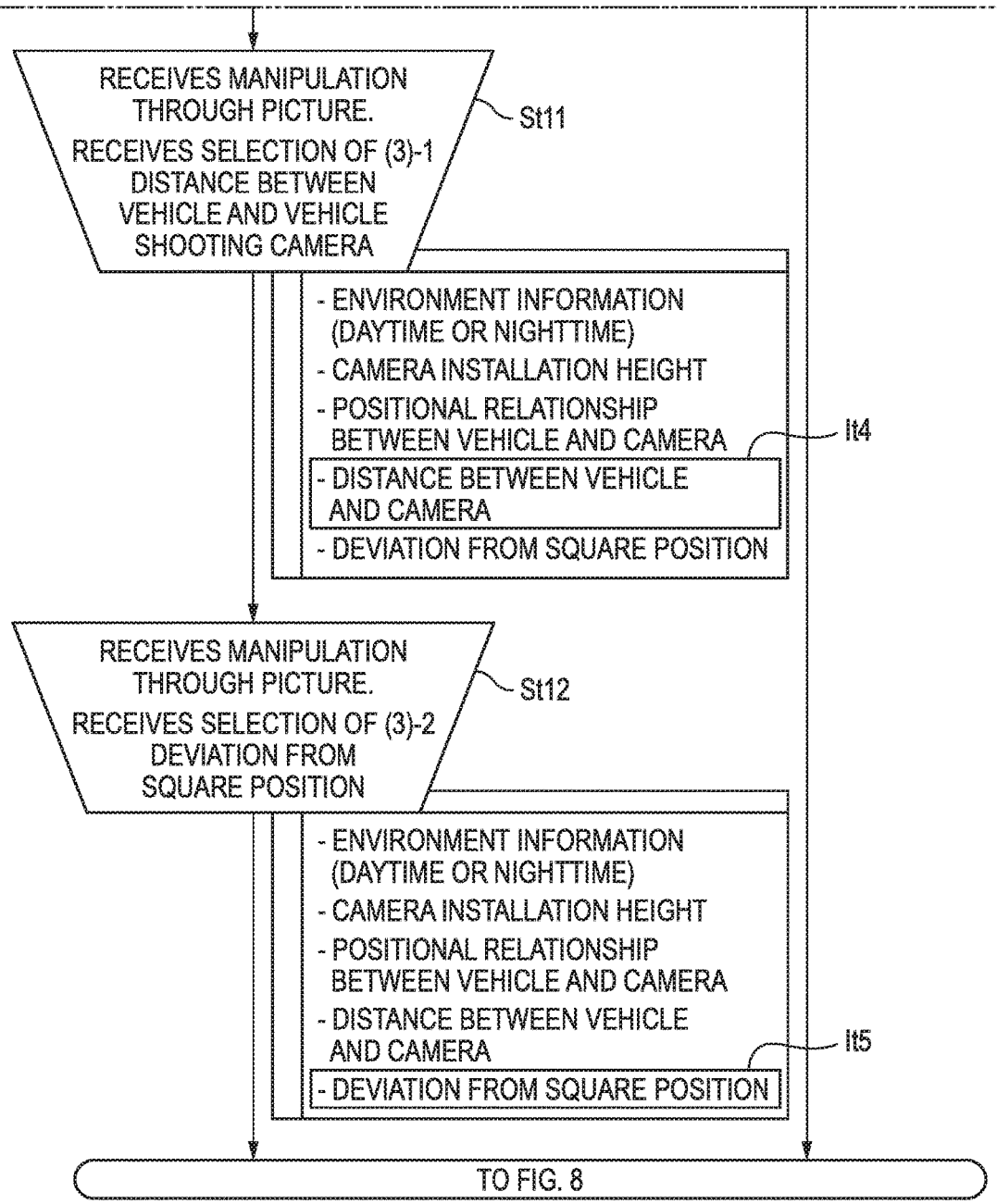

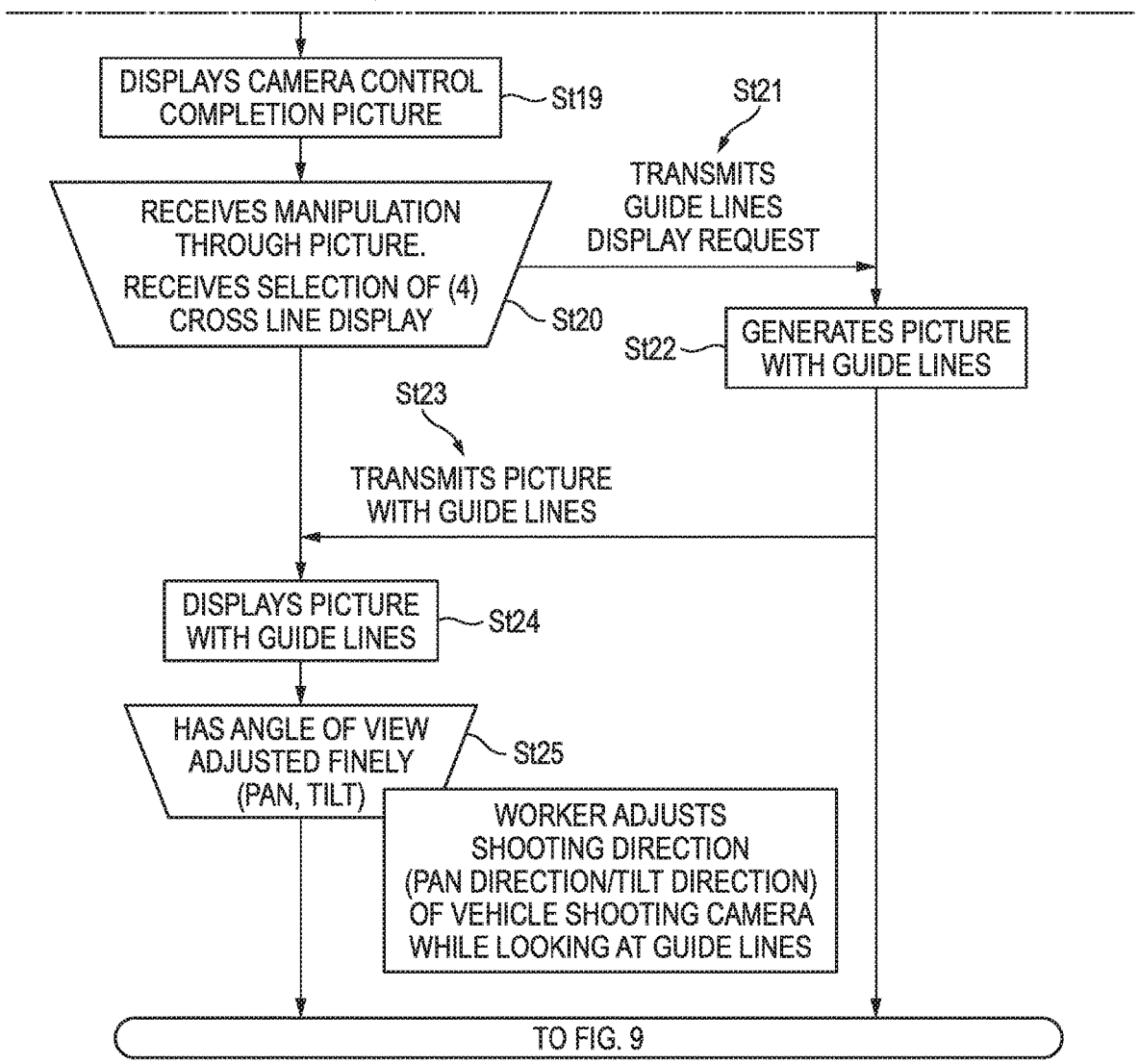

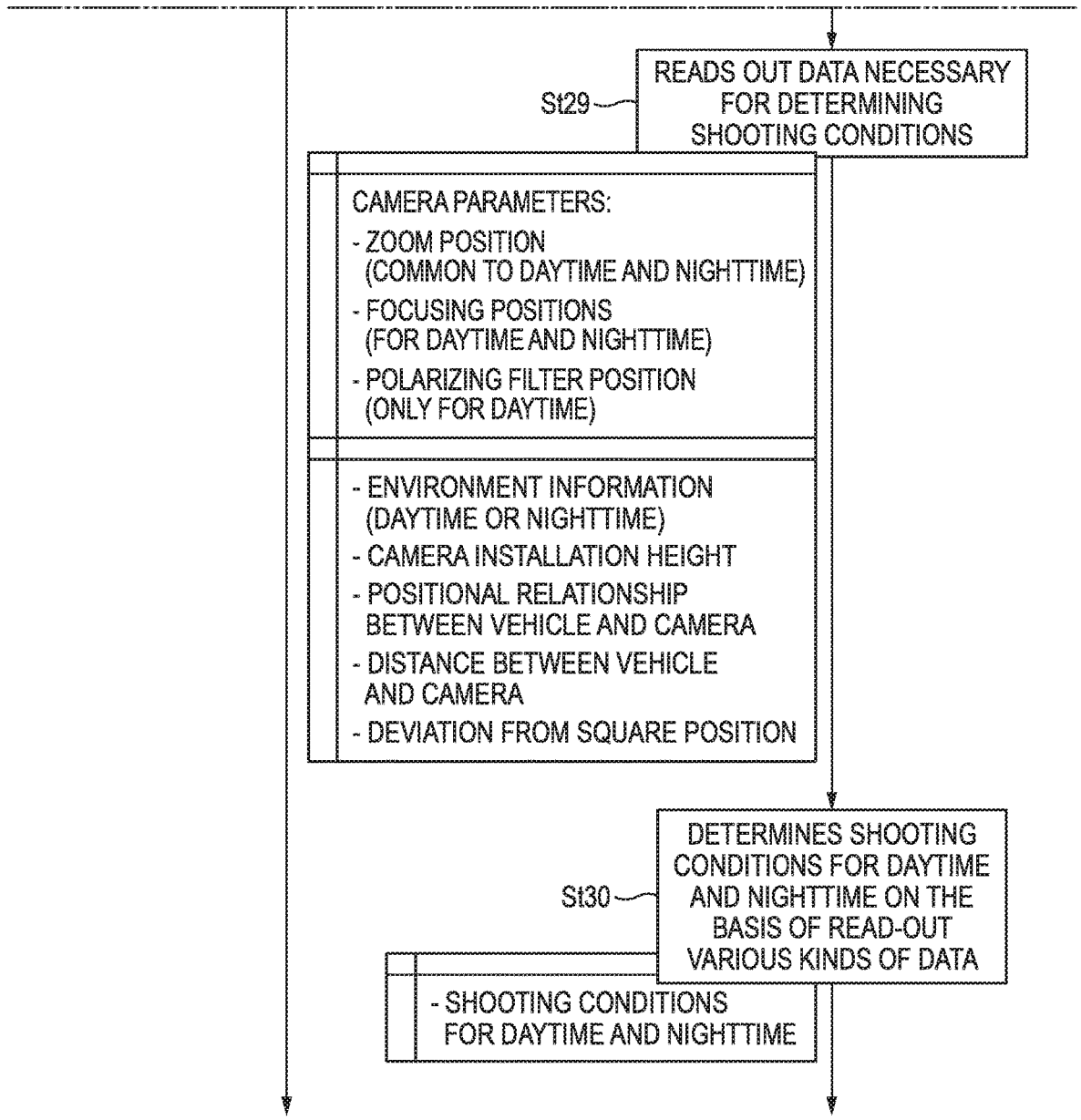

FIG. 13

|  | DAYTIME MODE | NIGHTTIME MODE |
|---|---|---|
| FRONT FILTER SWITCHING MODULE 21 | POLARIZING FILTER | BANDPASS FILTER |
| INTRA-LENS FILTER SWITCHING MODULE 19 | IR-CUTTING FILTER | RAW GLASS MEMBER |
| NIGHTTIME SHORT-WAVELENGTH ILLUMINATION DEVICES (LED'S) 16 | TURNED OFF | TURNED ON |

TBL1

CAMERA PARAMETER SETTING SYSTEM AND CAMERA PARAMETER SETTING METHOD

BACKGROUND OF THE INVENTION

1. Field of the Invention

The present invention relates to a camera parameter setting system and a camera parameter setting method for setting camera parameters.

2. Background Art

JP-A-2007-174016 discloses a vehicle shooting apparatus that is simple in configuration and can recognize a license plate and to shoot a driver with high image quality. This vehicle shooting apparatus is equipped with a body that is installed beside a road, a camera unit for shooting vehicles running on the road through a lens provided in the body, a top illumination unit that is installed above the lens in the body and illuminates an upper illumination range, and a bottom illumination unit that is installed below the lens in the body and illuminates a lower illumination range. The body is installed in such a manner that its bottom surface is put on leg portions that are installed on an island located beside a running lane.

SUMMARY OF THE INVENTION

Now assume a case of installing a monitoring camera as disclosed in JP-A-2007-174016 that serves to shoot a license plate and a person existing in a vehicle such as a driver by, for example, attaching it to a pole erected beside an ordinary road or installing it in such a manner that it is hung from a gantry installed in an expressway. It is preferable to install the monitoring camera in a short time because the installation may require closure of the ordinary road or expressway for a certain period of time. Furthermore, since such a monitoring camera is required to continue to shoot all the time in each day, to acquire high visibility images of license plates and persons existing in vehicles, it is necessary to set proper camera parameters in each of the daytime and the nighttime. However, in JP-A-2007-174016, no consideration is given to set proper camera parameters for the daytime and those for the nighttime in a short time. That is, the prior art has a problem that proper camera parameters for the daytime and those for the nighttime cannot be set in a short time in monitoring cameras as mentioned above that are installed in ordinary roads and expressways.

The present disclosure has been conceived in the above circumstances in the art and an object of the disclosure is therefore to provide a camera parameter setting system and a camera parameter setting method for assisting the setting of proper camera parameters for the daytime and those for the nighttime in a short time in installing a monitoring camera so that it can capture a road.

The disclosure provides a camera parameter setting system including at least one camera and a terminal that is communicably connected to the camera, wherein in installation work, the camera captures a vehicle including an occupant and a license plate of the vehicle in an view angle from an installation position of the camera and transmits, to the terminal, a captured image of the occupant and a captured image of the license plate in response to a setting request from the terminal; the terminal displays a setting screen including the captured image of the occupant and the captured image of the license plate, receives input of parameters including an operation mode of the camera and positional relationship information indicating a positional relationship between the camera and the vehicle based on manipulations of an operator, and transmits the input parameters to the camera; and the camera derives and sets camera parameters corresponding to the operation mode based on the input parameters transmitted from the terminal.

The disclosure also provides a camera parameter setting method performed by a camera parameter setting system including at least one camera and a terminal that is communicably connected to the camera, in installation work, by the camera, capturing a vehicle including an occupant and a license plate of the vehicle in a view angle from an installation position of the camera and transmitting, to the terminal, a captured image of the occupant and a captured image of the license plate in response to a setting request from the terminal; by the terminal, displaying a setting screen including the captured image of the occupant and the captured image of the license plate, receives input of parameters including an operation mode of the camera and positional relationship information indicating a positional relationship between the camera and the vehicle based on manipulations of an operator, and transmitting the input parameters to the camera; and by the camera, deriving and setting camera parameters corresponding to the operation mode based on the input parameters transmitted from the terminal.

The disclosure makes it possible to assist the setting of proper camera parameters for the daytime and those for the nighttime in a short time in installing a monitoring camera so that it can capture a road.

BRIEF DESCRIPTION OF THE DRAWINGS

FIG. 5A shows an example tracking table.

FIG. 5B shows an example angle-of-view table.

FIG. 5C shows an example polarizing filter rotation angle table.

FIG. 13 is a table showing examples of various kinds operation controls performed in each of a daytime mode and a nighttime mode.

DETAILED DESCRIPTION OF THE EXEMPLARY EMBODIMENT

A camera parameter setting system and a camera parameter setting method according to a specific embodiment of the present disclosure will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure thoroughly and are not intended to restrict the subject matter set forth in the claims.

In the following description, an ordinary road or an expressway is used as an example of an area to be captured by a vehicle shooting camera of a camera parameter setting system (see FIG. 1) and an ordinary road or an expressway may be referred to generically as a "road."

Figure 1:
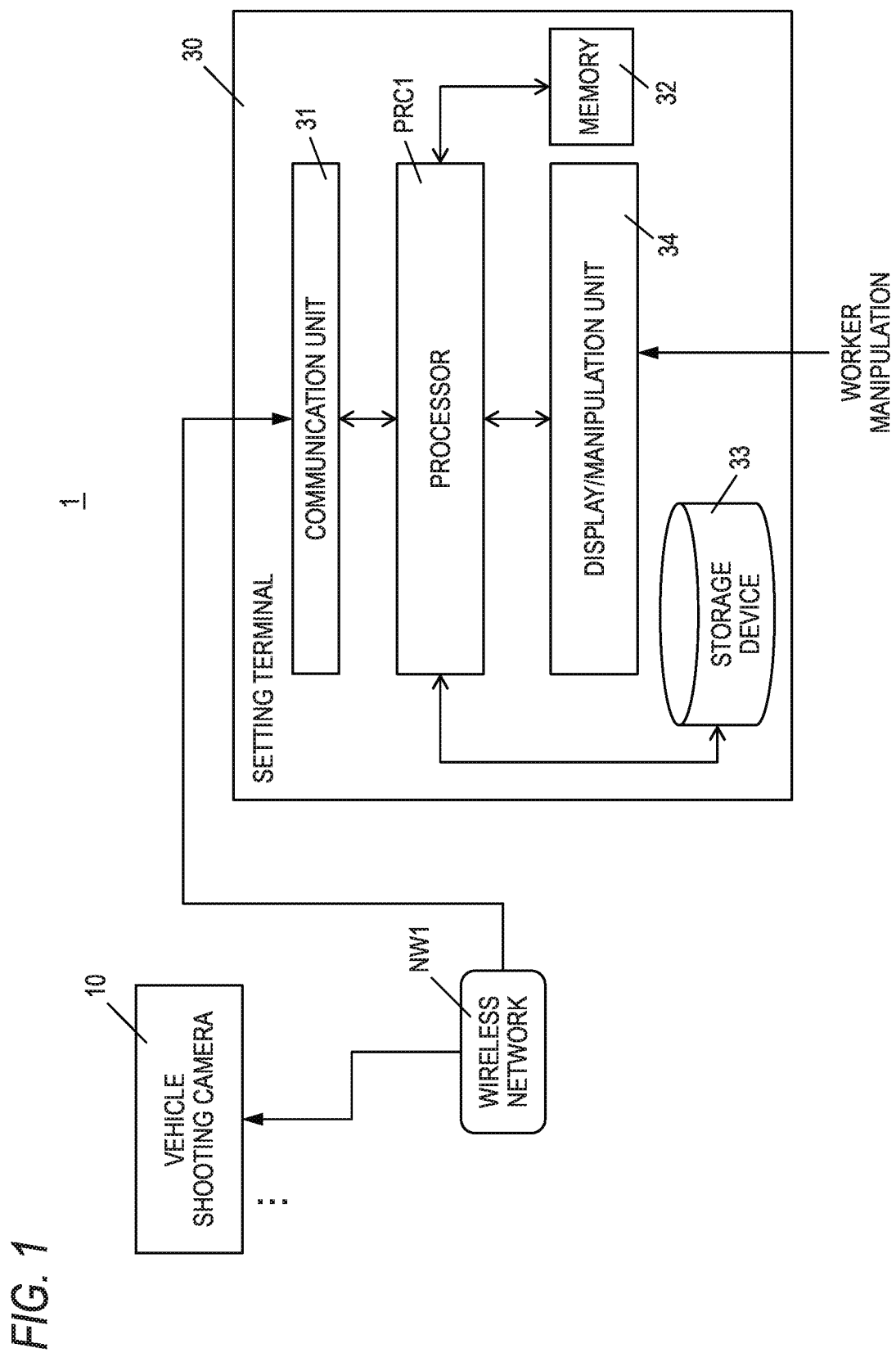
FIG. 1 is a block diagram showing a detailed example configuration of a camera parameter setting system according to the embodiment.

FIG. 1 is a block diagram showing a detailed configuration of a camera parameter setting system 1. The camera parameter setting system 1 includes a vehicle shooting camera 10 and a setting terminal 30 which can communicate with each other over a wireless network NW1. For example, the wireless network NW1 is a network that complies with a wireless LAN (local area network) such as WiFi (registered trademark), Bluetooth (registered trademark), or WiGig (Wireless Gigabit); however, the wireless network NW1 is not limited to any of them. Each of the vehicle shooting camera 10 and the setting terminal 30 may be equipped with a USB (Universal Serial Bus) connector, in which case the vehicle shooting camera 10 and the setting terminal 30 may be wire-connected using a USB cable.

The vehicle shooting camera 10 as an example camera is installed fixedly by, for example, being attached to a pole installed beside an ordinary road or hung from a gantry installed in an expressway. Having an angle of view (width: w; see FIG. 4), the vehicle shooting camera 10 captures a vehicle VCL1 (an example of the term "subject"; see FIG. 4) that has entered a capturing area (e.g., road) within the angle of view. Although only one vehicle shooting camera 10 is shown in FIG. 1 to simplify the description, plural vehicle shooting cameras 10 may be installed. The vehicle shooting camera 10 sends not only an image taken but also various kinds of data and information to the setting terminal 30 over the wireless network NW1. The various kinds of data and information are data and information that are exchanged between the vehicle shooting camera 10 and the setting terminal 30 in installing the vehicle shooting camera 10, and include data of an installation setting picture WD1 shown in FIG. 3 and camera parameter data that are part of capturing conditions (first capturing conditions and second capturing conditions (described later)) relating to capturing by the vehicle shooting camera 10. The details of the camera parameters that are set through the installation setting picture WD1 will be described later.

In the following description, an image taken includes not only image data but also a camera ID (identification) of the vehicle shooting camera 10 that has taken it and capturing date and time information. The vehicle shooting camera 10 performs shooting while switching, time-divisionally, between the first capturing conditions having image parameters (described later) suitable for capturing of a license plate of a vehicle VCL1 and the second capturing conditions having image parameters (described later) suitable for capturing of the face of an occupant(s) (a person(s)) existing in the vehicle VCL1. The vehicle shooting camera 10 captures the vehicle VCL1 under the first capturing conditions (e.g., an exposure time that is longer than a prescribed reference value) suitable for capturing of the face of a person(s) existing in the vehicle VCL1 (e.g., a driver or a driver and a passenger) and under the second capturing conditions (e.g., an exposure time that is shorter than the prescribed reference value) suitable for capturing of a vehicle license plate.

Where the frame rate is, for example, 30 fps, the vehicle shooting camera 10 can take an image of the vehicle VCL1 (i.e., an image including a clear image(s) of a person(s) existing in the vehicle VCL1) under the first capturing conditions in odd-numbered frames (e.g., first frame, third frame, . . . , 29th frame). And where the frame rate is 30 fps, the vehicle shooting camera 10 can take an image of the vehicle VCL1 (i.e., an image including a clear image of the license plate) under the second capturing conditions in even-numbered frames (e.g., second frame, fourth frame, . . . , 30th frame). In this manner, for the same subject (e.g., vehicle VCL1), the vehicle shooting camera 10 can take (generate) an image including a clear image of the face of a person(s) existing in the vehicle VCL1 and an image including a clear image of the license plate approximately at the same time.

The setting terminal 30 (an example of the term "terminal") a portable wireless communication terminal that is used by a worker (an example of the term "operator") in installing the vehicle shooting camera 10 and is a tablet terminal, for example. Since the installation setting picture WD1 (an example of the term "setting picture"; see FIG. 3) is displayed on the setting terminal 30, it is preferable that the setting terminal 30 be one having a display device of such a size as to be easy for a worker to see; however, the setting terminal 30 may be a smartphone from the viewpoint of allowing a worker to manipulate it with increased ease. In installing the vehicle shooting camera 10, the setting terminal 30 receives an option or value (described later) that has been input or selected according to a manipulation of a worker and is necessary for calculation of camera parameters of the vehicle shooting camera 10 and transmits a camera parameters setting request containing the input or selected options and values (an example of the term "parameters").

For example, the camera parameters include a zoom lens position (hereinafter may be referred to as a "zoom position") that determines a zoom magnification common to a daytime mode and a nighttime mode, a focusing lens position (hereinafter may be referred to as a "focusing position") for focusing the vehicle shooting camera 10 on the subject (e.g., vehicle VCL1) in the daytime mode or the nighttime mode, and a PLF position (described later) that determines a rotation angle of a polarizing filter used in the daytime mode. However, it goes without saying that the camera parameters are not limited to the above. For example, the camera parameters may include options and values that are necessary for calculation of the camera parameters of the vehicle shooting camera 10.

The setting terminal 30 is equipped with a communication unit 31, a memory 32, a recording device 33, a display/manipulation unit 34, and a processor PRC1.

The communication unit 31 performs a wireless communication with the vehicle shooting camera 10 which is connected to it by the wireless network NW1.

The memory 32 includes, for example, a RAM (random access memory) and a ROM (read-only memory) and stores programs that are necessary for operation of the setting terminal 30 and temporarily stores data and information generated during operation of the setting terminal 30. For example, the RAM is a work memory that is used during operation of the processor PRC1. For example, programs for controlling the processor PRC1 are stored in the ROM in advance.

For example, the recording device 33 is a semiconductor memory such as a flash memory, an HDD (hard disk drive), or an SSD (solid-state drive). The recording device 33 stores data or information received from the processor PRC1 according to a storage manipulation performed by a worker on the display/manipulation unit 34.

The display/manipulation unit 34 receives a manipulation performed by a worker (an example of the term "operator") and displays data (e.g., data of an installation setting picture WD1) or information produced by processing of the processor PRC1. For example, the display/manipulation unit 34 may be configured using a touch panel. A manipulation signal is input from the display/manipulation unit 34 to the processor PRC1 of the setting terminal 30 in response to a manipulation of a worker. For example, when information "daytime" or "nighttime" indicating an environment (more specifically, time slot) at the time of installation and such information as an installation height of the vehicle shooting camera 10 are input by a worker, these pieces of information are input to the processor PRC1.

For example, the processor PRC1 is a CPU (central processing unit), a DSP (digital signal processor), or an FPGA (field-programmable gate array). Functioning as a control unit of the setting terminal 30, the processor PRC1 performs control processing for controlling the operations of the respective units of the setting terminal 30 in a centralized manner, processing for input/output of data between the individual units of the setting terminal 30, data computation processing, and data storage processing. The processor PRC1 operates according to the programs stored in the memory 32. The processor PRC1 uses the memory 32 while operating and displays an installation setting picture WD1 (see FIG. 3) sent from the vehicle shooting camera 10 on the display/manipulation unit 34.

Figure 2:
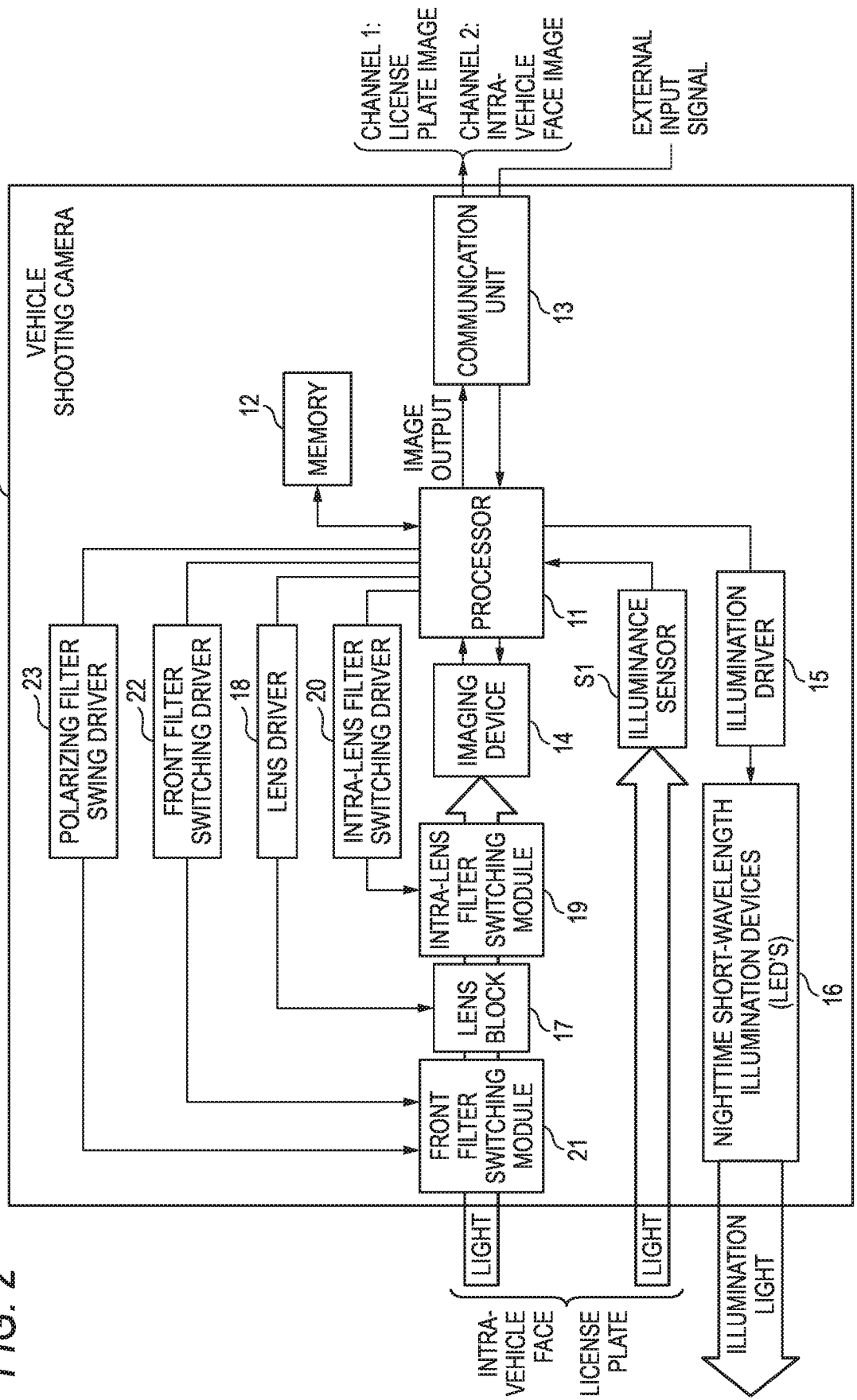
FIG. 2 is a block diagram showing a detailed example hardware configuration of a vehicle shooting camera.

FIG. 2 is a block diagram showing an example hardware configuration of the vehicle shooting camera 10. The vehicle shooting camera 10 is equipped with a processor 11, a memory 12, a communication unit 13, an imaging device 14, an illumination driver 15, nighttime short-wavelength illumination devices 16, a lens block 17, a lens driver 18, an intra-lens filter switching module 19, an intra-lens filter switching driver 20, a front filter switching module 21, a front filter switching driver 22, a polarizing filter swing driver 23, and an illuminance sensor S1.

For example, the processor 11 is a CPU, a DSP, or an FPGA. Functioning as a controller of the vehicle shooting camera 10, the processor 11 performs control processing for controlling the operations of the respective units of the vehicle shooting camera 10 in a centralized manner, processing for input/output of data between the individual units of the vehicle shooting camera 10, data computation processing, and data storage processing. The processor 11 operates according to programs stored in the memory 12. The processor 11 uses the memory 12 while operating and stores, temporarily, data or information generated or acquired by the processor 11.

The memory 12 includes, for example, a RAM and a ROM and stores programs that are necessary for operation of the vehicle shooting camera 10 and temporarily stores data and information generated during operation of the vehicle shooting camera 10. For example, the RAM is a work memory that is used during operation of vehicle shooting camera 10. For example, the programs for controlling the vehicle shooting camera 10 are stored in the ROM in advance.

The communication unit 13 can communicate with the setting terminal 30 via a wired communication network or the wireless network NW1 (e.g., wireless LAN such as WiFi (registered trademark), Bluetooth (registered trademark), or WiGig). The communication unit 13 delivers (transmits) an image (may be referred to as a "license plate image") taken under the first capturing conditions that are suitable for capturing of the license plate of a vehicle, for example, to the setting terminal 30 on channel 1. The communication unit 13 delivers (transmits) an image (may be referred to as a "intra-vehicle face image") taken under the second capturing conditions that are suitable for capturing of the face of a person in a vehicle, for example, to the setting terminal 30 on channel 2.

Furthermore, the communication unit 13 receives an external input signal transmitted from the setting terminal 30 and outputs it to the processor 11. This external input signal is a command to change the camera parameters of the vehicle shooting camera 10 produced in response to, for example, a manipulation performed by a worker who has seen the installation setting picture WD1 (see FIG. 3) displayed on the setting terminal 30. For example, the camera parameters may include an exposure time of an electronic shutter, a gain of amplification of an electrical signal of an image taken by the imaging device 14, and intensity of illumination light emitted from the nighttime short-wavelength illumination devices 16; however, the camera parameters are not limited to them. The processor 11 changes (re-sets) corresponding camera parameters according to this external input signal. Each newly set camera parameter is set for the corresponding one(s) of the imaging device 14 and the nighttime short-wavelength illumination devices 16.

The imaging device 14 is an image sensor capable of taking a high-resolution image of 2K, 4K, 8K, or the like and includes a solid-state imaging device such as a CCD (charge-coupled device) or a CMOS (complementary metal-oxide-semiconductor) sensor. This solid-state imaging device generates an electrical signal of an image taken corresponding to an optical image formed on the imaging surface by performing photoelectric conversion on the optical image. The imaging device 14 may be composed of the above solid-state imaging device and an integrated circuit board incorporating an amplifier for amplifying an electrical signal that is output from the solid-state imaging device, a gain adjustment unit capable of adjusting the gain (sensitivity) of the amplifier, an electronic shutter (may be referred to simply as a "shutter") whose imaging time (what is called an exposure time) can be controlled, and an exposure control circuit for controlling the exposure time of the electronic shutter. Data of an image taken may be generated in such a manner that an output of the imaging device 14 is input to the processor 11 and subjected to prescribed signal processing there. Alternatively, the imaging device 14 may be provided with a control circuit for generating data of an image taken by performing the above prescribed signal processing.

The illumination driver 15 is configured using, among other things, a switching circuit for switching between turning-on and turning-off of each of the plural nighttime short-wavelength illumination devices 16. The illumination driver 15 switches between turning-on and turning-off of each of the plural nighttime short-wavelength illumination devices 16 according to a control instruction sent from the processor 11. The illumination driver 15 may further have a variable amplification circuit or the like capable of adjusting the light emission amount (intensity) of the nighttime short-wavelength illumination devices 16. In this case, the illumination driver 15 can perform light intensity adjustment by adjusting the light emission amount (intensity) of the nighttime short-wavelength illumination devices 16 according to a control instruction sent from the processor 11.

The nighttime short-wavelength illumination devices 16, which are an example IR illumination unit, are plural (10 to 20) LEDs (light-emitting diodes), for example. The nighttime short-wavelength illumination devices 16 emit IR light (near infrared light) that is illumination light whose intensity is controlled by the illumination driver 15, to make it possible to capture a subject (e.g., vehicle) existing in the angle of view while the operation mode of the vehicle shooting camera 10 is the nighttime mode.

The lens block 17 includes a focusing lens for forming an optical image of a subject on the imaging surface of the imaging device 14 by performing focusing according to the distance from the vehicle shooting camera 10 to a subject and a zoom lens capable of changing the magnification from telephoto side to the wide angle side. In the embodiment 1, a position of the focusing lens and a position of the zoom lens in the lens block 17 are examples of the lens parameters and stored in the memory 12. As described later in detail, a focusing lens position and a zoom lens position are calculated by the processor 11 using information sent from the setting terminal 30 in installing the vehicle shooting camera 10. Different values are used for the focusing lens position depending on the operation mode (more specifically, whether it is the daytime mode or the nighttime mode) of the vehicle shooting camera 10.

The lens driver 18 is configured using an electric circuit for adjusting the positions of the lenses (e.g., focusing lens and zoom lens) constituting the lens block 17. The lens driver 18 adjusts the focusing lens position in the lens block 17 according to a control instruction from the processor 11. The lens driver 18 may change the zoom magnification by adjusting the zoom lens position according to a control instruction from the processor 11.

The intra-lens filter switching module 19 is disposed in the rear of the lens block 17 (i.e., on the opposite side of the lens block 17 to the objective side) and in front of the imaging device 14 (i.e., on the same side of the imaging device 14 as the objective side). The intra-lens filter switching module 19 is configured so as to switch between an IR cutting filter and a raw glass (i.e., non-strengthened glass) member alternately and dispose the selected one on the optical axis of the optical system. The intra-lens filter switching module 19 places the IR cutting filter on the optical axis in the daytime mode, for example. As a result, in the daytime mode, the imaging device 14 receives RGB (red, green, blue) light obtained by cutting an IR component and hence can take a visible light image that is high in image quality. On the other hand, the intra-lens filter switching module 19 places the raw glass member on the optical axis in the nighttime mode, for example. As a result, in the nighttime mode, the imaging device 14 receives incident light that has been obtained without cutting an IR component by the IR cutting filter and passed through the raw glass member, and hence can take an IR image having a certain level of brightness (in other words, not being too dark) on the basis of the received incident light.

The intra-lens filter switching driver 20 is configured using an electric circuit for driving the intra-lens filter switching module 19. The intra-lens filter switching driver 20 drives the intra-lens filter switching module 19 according to a control signal sent from the processor 11 and thereby places the IR cutting filter or the raw glass member on the optical axis.

The front filter switching module 21 is configured so as to switch between a bandpass filter and a polarizing filter alternately (e.g., by sliding in the left-right direction) and thereby places the bandpass filter or the polarizing filter on the optical axis. Since the front filter switching module 21 is disposed on the same side of the lens block 17 as the subject side (objective side) on the optical axis, mechanical adjustments (e.g., for maintenance) on the front filter switching module 21 can be made easily.

The front filter switching driver 22 is configured using an electric circuit for driving a front filter switching module motor (not shown). The front filter switching driver 22 places the bandpass filter or the polarizing filter on the optical axis by moving the front filter switching module 21 by driving the front filter switching module motor according to a control instruction sent from the processor 11.

The polarizing filter swing driver 23 is configured using an electric circuit for driving a polarizing filter rotation motor (not shown). In accordance with the control instruction from the processor 11, the polarizing filter swing driver 23 rotates the polarization axis of the polarizing filter placed on the optical axis about the optical axis by a prescribed angle (e.g., deviation angle θp (described later)) by driving the polarizing filter rotation motor. The amount of light passing through the polarizing filter is restricted when the polarization axis of the polarizing filter is inclined.

The polarizing filter can be rotated in a mechanical rotation range (i.e., mechanical stroke). When the rotation speed of the polarizing filter rotation motor is increased after its activation, the angular velocity of the polarizing filter rotation motor increases gradually and reaches a prescribed angular velocity. Accordingly, the polarizing filter makes a transition from acceleration to a range in which it can rotate at a constant speed (i.e., soft stroke).

On the other hand, when the rotation speed of the polarizing filter rotation motor is decelerated, the angular velocity of the polarizing filter rotation motor decreases gradually to 0. The rotation speed of the polarizing filter is decelerated from the prescribed speed. A range where the polarizing filter can rotate at a constant speed (i.e., soft stroke) can be adjusted in a desired manner by torque of the polarizing filter rotation motor. The angle (deviation angle) of the polarization axis of the polarizing filter is adjusted by a rotation amount of the polarizing filter from the origin that is detected by a polarizing filter rotation origin sensor (not shown). In the embodiment, the deviation angle $\theta p$ of the polarizing filter is one of the camera parameters and is stored in the memory 12. As described later in detail, the deviation angle $\theta p$ of the polarizing filter is calculated by the processor 11 using information sent from the setting terminal 30 in installing the vehicle shooting camera 10.

The illuminance sensor S1 detects ambient illuminance of the vehicle shooting camera 10. For example, a photodiode or a phototransistor is used as the illuminance sensor S1. The illuminance sensor S1 is attached to the front surface of a body of the vehicle shooting camera 10 so as to be able to detect illuminance in a direction in which a vehicle as a subject of the vehicle shooting camera 10 exists. Illuminance information (more specifically, illuminance value data) detected by the illuminance sensor S1 is input to the processor 11. The processor 11 judges whether the current operation mode of the vehicle shooting camera 10 should be the daytime mode or the nighttime mode on the basis of the illuminance information.

If judging that the illuminance information has become larger than a prescribed threshold value (in other words, the environment is bright), the processor 11 makes such a setting as to cause the operation mode of the vehicle shooting camera 10 to make a transition to the daytime mode. If judging that the illuminance information has become smaller than the prescribed threshold value (in other words, the environment is dark), the processor 11 makes such a setting as to cause the operation mode of the vehicle shooting camera 10 to make a transition to the nighttime mode. The current operation mode is maintained if the current illuminance information has not become larger or smaller than the prescribed threshold value. For example, information (e.g., flag) indicating the daytime mode or the nighttime mode is stored in the memory 12 temporarily.

Figure 3:
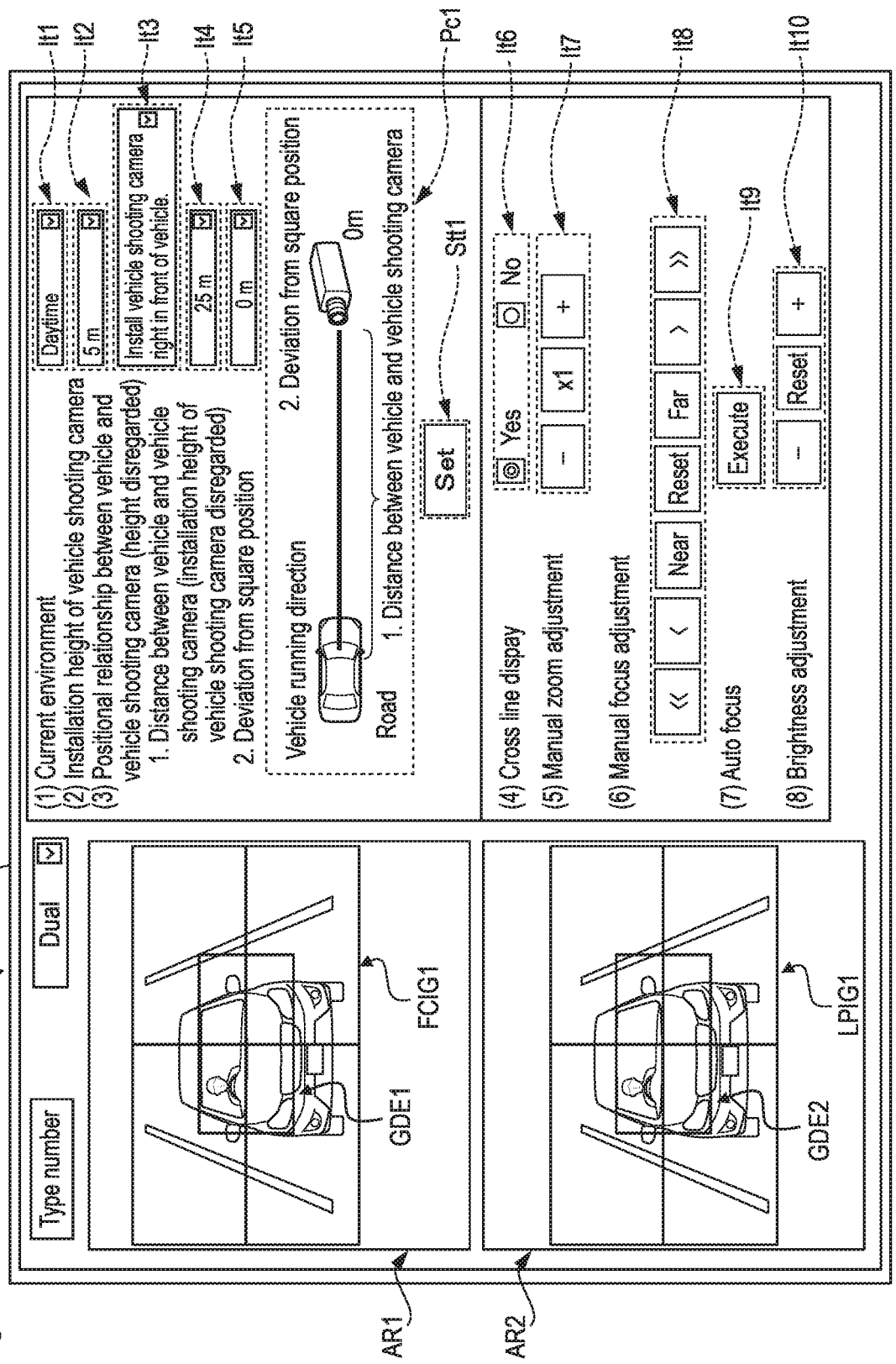
FIG. 3 shows an example display of an installation setting picture.

FIG. 3 shows an example display of the installation setting picture WD1. The installation setting picture WD1 is displayed on the display/manipulation unit 34 of the setting terminal 30 (that is connected to the vehicle shooting camera 10 in such a manner that a wireless communication is possible between them) in response to a worker manipulation in installing the vehicle shooting camera 10. The installation setting picture WD1 includes a first display area AR1 in which an intra-vehicle face image FCIG1 of a vehicle VCL1 as a subject of the vehicle shooting camera 10 is displayed, a second display area AR2 in which a license plate image LPIG1 of the vehicle VCL1, and a third display area AR3 in which various items for which selection or input is made and contents of each item are displayed in setting the camera parameters of the vehicle shooting camera 10.

The intra-vehicle face image FCIG1 is displayed in the first display area AR1. The intra-vehicle face image FCIG1 is an image taken by the vehicle shooting camera 10 under the first capturing conditions (e.g., the exposure time is set longer than a prescribed reference value) that are suitable for capturing of the face of a person(s) existing in the vehicle VCL1 (e.g., a driver or a driver and a passenger). Thus, the intra-vehicle face image FCIG1 allows a worker who has seen the installation setting picture WD1 can recognize the face of the person(s) existing in a vehicle VCL1 (e.g., driver) visually and clearly. The intra-vehicle face image FCIG1 displayed in the first display area AR1 and the license plate image LPIG1 displayed in the second display area AR2 have the same size. This allows the worker to consider whether it is necessary to set the camera parameters by comparing the intra-vehicle face image FCIG1 having the same image size with the license plate image LPIG1.

The license plate image LPIG1 is displayed in the second display area AR2. The license plate image LPIG1 is an image taken by the vehicle shooting camera 10 under the second capturing conditions (e.g., the exposure time is set shorter than the prescribed reference value) that are suitable for capturing of a vehicle license plate. Thus, the worker who has seen the installation setting picture WD1 can recognize the license plate of the vehicle VCL1 visually and clearly by the license plate image LPIG1.

For example, combinations of first to eighth items and sets of contents (more specifically, options, values, or icons of each of the items for input or selection) and a "set" icon Stt1 are displayed in the third display area AR3.

When the "set" icon Stt1 is pushed by the worker, a camera parameters setting request that is based on input or selection results of the first to eighth items is sent to the vehicle shooting camera 10.

In the installation setting picture WD1 shown in FIG. 3, an option It1 (e.g., "daytime") selected by the worker is designated as a first item "current environment" which indicates, as an operation mode of the vehicle shooting camera 10, a time slot (e.g., daytime or nighttime) in which to install the vehicle shooting camera 10. The operation mode of the vehicle shooting camera 10 includes the daytime mode and the nighttime mode. The setting terminal 30 may select "daytime" or "nighttime" automatically as the option It1 according to an output of a timer circuit (not shown) that is built in the processor PRC1. This makes it unnecessary for the worker to make an input for selection of the option It1.

Figure 4:
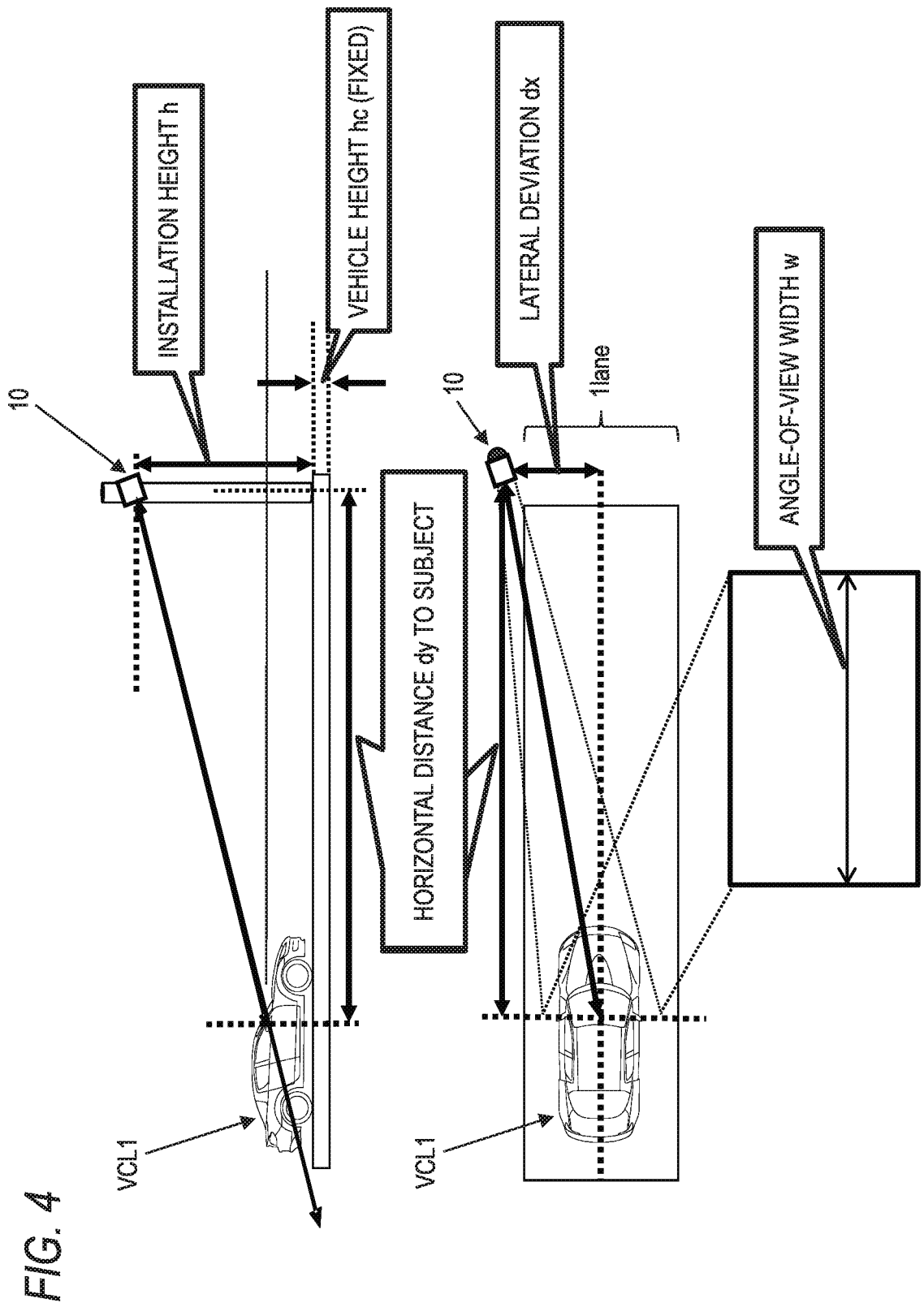
FIG. 4 shows an example positional relationship between the vehicle shooting camera and a vehicle at the time of capturing.

An option It2 (e.g., "5 m") input by the worker is designated as a second item "installation height of vehicle shooting camera." As shown in FIG. 4, the "installation height of vehicle shooting camera" indicates a height, from, for example, the ground ("0 m"), of an installation position of the vehicle shooting camera 10, as an example of positional relationship information indicating a positional relationship between the vehicle shooting camera 10 and the vehicle VCL1 as a subject on which focusing can be made.

An option It3 (e.g., "Install vehicle shooting camera right in front of vehicle.") input by the worker is designated as a third item "positional relationship between vehicle and vehicle shooting camera." For the third item It3, three selectable options (see FIG. 7) are displayed as candidates (in other words, examples of the above-mentioned "positional relationship information") for information indicating a positional relationship between the vehicle shooting camera 10 and the vehicle VCL1 (subject). More specifically, the first option corresponds to a case that the vehicle shooting camera 10 is installed in such a direction as to be right in front of the vehicle VCL1. In this case, a positional relationship image Pc1 is displayed in the installation setting picture WD1 (see FIGS. 7 and 16). The second option corresponds to a case that the vehicle shooting camera 10 is installed at a position that is deviated leftward from the position right in front of the vehicle VCL1. In this case, a positional relationship image Pc2 is displayed in the installation setting picture WD1 (see FIGS. 7 and 15). The third option corresponds to a case that the vehicle shooting camera 10 is installed at a position that is deviated rightward from the position right in front of the vehicle VCL1. In this case, a positional relationship image Pc3 is displayed in the installation setting picture WD1 (see FIGS. 7 and 17).

Two subitems are provided as subordinate items to the third option (in other words, examples of the above-mentioned "positional relationship information"). More specifically, in the installation setting picture WD1 shown in FIG. 3, a value It4 (e.g., "25 m") is designated as the first subitem "distance between vehicle and vehicle shooting camera." A value It5 (e.g., "0 m") input by the worker is designated as the second subitem "distance between vehicle and vehicle shooting camera."

When one of the three options (see FIG. 7) of the third item "positional relationship between vehicle and vehicle shooting camera" is designated, one (e.g., positional relationship image Pc1), corresponding to the designated option, of the three positional relationship images Pc1, Pc2, and Pc3 is displayed.

An option It6 (e.g., "yes") input by the worker is designated as a fourth item "cross line display." According to this designation, the setting terminal 30 superimposes guide lines GDE1 on the intra-vehicle face image FCIG1 displayed in the first display area AR1. For example, the guide lines GDE1 include two lines each connecting the centers of confronting sides of the intra-vehicle face image FCIG1 and a rectangular frame that is centered at the center of the intra-vehicle face image FCIG1 and is a fraction of the intra-vehicle face image FCIG1 in size. When seeing the intra-vehicle face image FCIG1, the worker can easily judge, by referring to the guide lines GDE1, whether the angle of view, pan direction, or tilt direction of the vehicle shooting camera 10 needs to be adjusted.

When the option It6 "yes" is designated, the setting terminal 30 superimposes guide lines GDE2 on the license plate image LPIG1 displayed in the second display area AR2. For example, the guide lines GDE2 include two lines each connecting the centers of confronting sides of the license plate image LPIG1 and a rectangular frame that is centered at the center of the license plate image LPIG1 and is a fraction of the intra-vehicle face image FCIG1 in size. When seeing the license plate image LPIG1, the worker can easily judge, by referring to the guide lines GDE2, whether the angle of view, pan direction, or tilt direction of the vehicle shooting camera 10 needs to be adjusted.

Adjustment icons It7 one of which can be selected by the user are displayed as a fifth item "manual zoom adjustment." The zoom lens position (zoom position) that determines the zoom magnification of the vehicle shooting camera 10 can be changed by the adjustment icons It7. For example, a "+" icon is to request a zoom position change for increasing the zoom magnification and a "−" icon is to request a zoom position change for decreasing the zoom magnification.

Adjustment icons It8 one of which can be selected by the user are displayed as a sixth item "manual focus adjustment." That is, the worker can change the focus lens positions (focusing positions) using the adjustment icons It8. For example, ">" and ">>" icons are to request changing to a far-side focusing position on the (in other words, far-side depth of field) of the subject as viewed from the vehicle shooting camera 10 and "<" and "<<" icons are to request changing to a near-side focusing position (in other words, near-side depth of field) of the subject as viewed from the vehicle shooting camera 10.

An icon It9 "execute" that can be selected by the worker and requests execution of autofocusing is displayed as a seventh item "auto focus." That is, when the icon It9 "execute" is pushed by the worker, the setting terminal 30 sends, to the vehicle shooting camera 10, a request for executing autofocusing using the current camera parameters (more specifically, focusing position).

Brightness adjustment icons It10 one of which can be selected by the worker is displayed as an eighth item "brightness adjustment." That is, when one of the brightness adjustment icons It10 is pushed by the user who has seen the intra-vehicle face image FCIG1 or the license plate image LPIG1, the setting terminal 30 sends, to the vehicle shooting camera 10, a request for performing processing of changing the brightness of the image to brightness specified by the user manipulation.

Input results and selection results of the first to third items are stored in the memory 32 temporarily until pushing of the "set" icon Stt1 by the worker is detected by the processor PRC1. Thus, when pushing of the "set" icon Stt1 is detected by the processor PRC1, a camera parameters setting request containing what have been input or selected by the pushing of the "set" icon Stt1 is sent from the setting terminal 30 to the vehicle shooting camera 10. If input or selection, made when necessary, of one of the fourth to eighth items is detected by the setting terminal 30, a camera parameters setting request containing what has thus been input or selected is sent from the setting terminal 30 to the vehicle shooting camera 10.

Next, the operation procedure of the camera parameter setting system 1 according to the embodiment will be described with reference to FIGS. 4, 5A-5C, 6, 7, 8, and 9. FIG. 4 shows an example positional relationship between the vehicle shooting camera 10 and a vehicle VCL1 at the time of capturing. FIG. 5A shows an example tracking table. FIG. 5B shows an example angle-of-view table. FIG. 5C shows an example polarizing filter rotation angle table. FIGS. 6-9 are a sequence diagram showing an example procedure of a camera parameters setting operation performed by the setting terminal 30 and the vehicle shooting camera 10. The tracking table, the angle-of-view table, and the polarizing filter rotation angle table are stored in, for example, the memory 12 of the vehicle shooting camera 10.

First, the procedure of pieces of work from unpacking of a package of the vehicle shooting camera 10 to its installation will be described roughly as what should be described before the procedure of FIGS. 6-9. The vehicle shooting camera 10 is installed by plural workers, for example. The following description will be directed to a case of attaching the vehicle shooting camera 10 fixedly to a pole that is installed beside an ordinary road. In the following description of the procedure of FIGS. 6-9, the terms "vehicle shooting camera" may be abbreviated as a "camera."

(Step 1) A corrugated paperboard package of the vehicle shooting camera 10 is unpacked is unpacked and taken out from it by workers.

(Step 2) An attachment metal fitting (not shown) to be used for fixing the vehicle shooting camera 10 to a pole is attached to the vehicle shooting camera 10 by workers.

(Step 3) An IP (Internet Protocol) address of the vehicle shooting camera 10 is set by a worker.

(Step 4) In, for example, the nighttime, a worker gets on an aerial lift truck prepared in advance and workers close an ordinary road concerned for a prescribed time permitted in advance by an application.

(Step 5) Workers set Color Cones (registered trademark) and perform a traffic control of the ordinary road. The worker installs vehicle shooting camera 10 at an installation site (i.e., attaches it to the pole fixedly) via the attachment metal fitting.

(Step 6) A worker powers on the vehicle shooting camera 10 and sets its angle of view tentatively by causing it to make a tentative rotation in each of the pan direction and the tilt direction.

Figure 6:
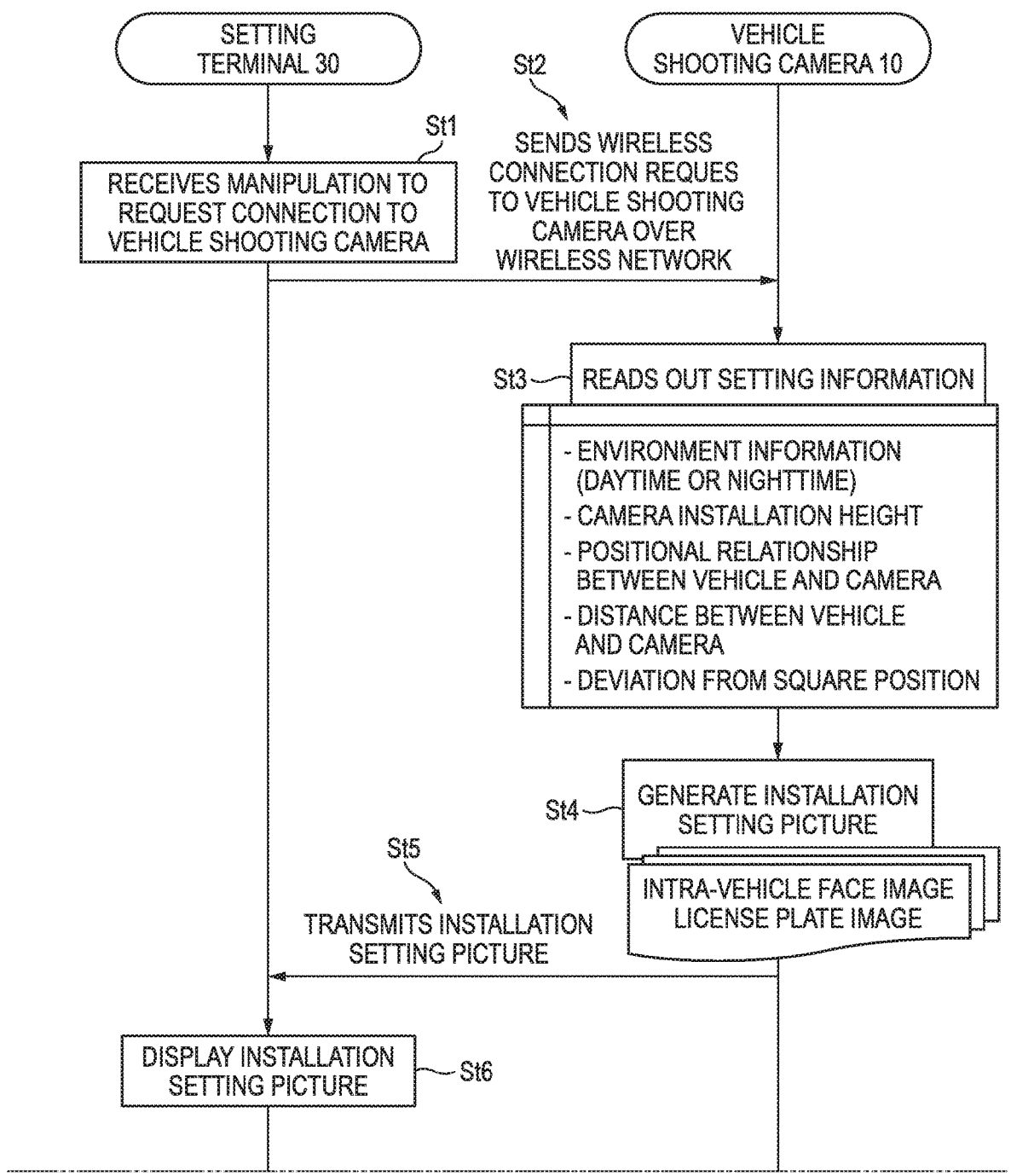
FIG. 6 is a first part of a sequence diagram showing an example procedure of a camera parameters setting operation performed by a setting terminal and the vehicle shooting camera.

Referring to FIG. 6, first, at step St1, a worker manipulates the setting terminal 30 to request connection to the vehicle shooting camera 10. At step St2, the setting terminal 30 sends a wireless connection request to the vehicle shooting camera 10 over the wireless network NW1, for example. If setting information such as camera parameters is already stored in the memory 12, at step St3 the vehicle shooting camera 10 reads out the setting information from the memory 12. For example, the setting information is a current environment (first item in FIG. 3), a camera installation height (second item in FIG. 3), a positional relationship between a vehicle and the camera (third item in FIG. 3), a distance between the vehicle and the camera (first subitem of the third item in FIG. 3), and a deviation from the square position (second subitem of the third item in FIG. 3). At step St4, the vehicle shooting camera 10 takes an intra-vehicle face image FCIG1 and a license plate image LPIG1 of a subject (e.g., vehicle VCL1) existing in the angle of view that was set tentatively at the above-mentioned step 6 and generates an installation setting picture WD1 (see FIG. 3) using the intra-vehicle face image FCIG1, the intra-vehicle face image FCIG1, and the setting information that was read out at step St3. At step St5, the vehicle shooting camera 10 transmits the generated installation setting picture WD1 to the setting terminal 30. At step St6, the setting terminal 30 displays the installation setting picture WD1 sent from the vehicle shooting camera 10 on the display/manipulation unit 34.

At step St7, first, the worker checks current environment information and manipulates the setting terminal 30 to input or select information indicating a current time slot (e.g., nighttime during which an ordinary road or an expressway can be closed easily) through the installation setting picture WD1. At step St8, the worker checks an installation height of the vehicle shooting camera 10 by referring to a design drawing or the like and manipulates the setting terminal 30 to input or select information indicating the installation height h (see FIG. 4) through the installation setting picture WD1.

Figure 7:
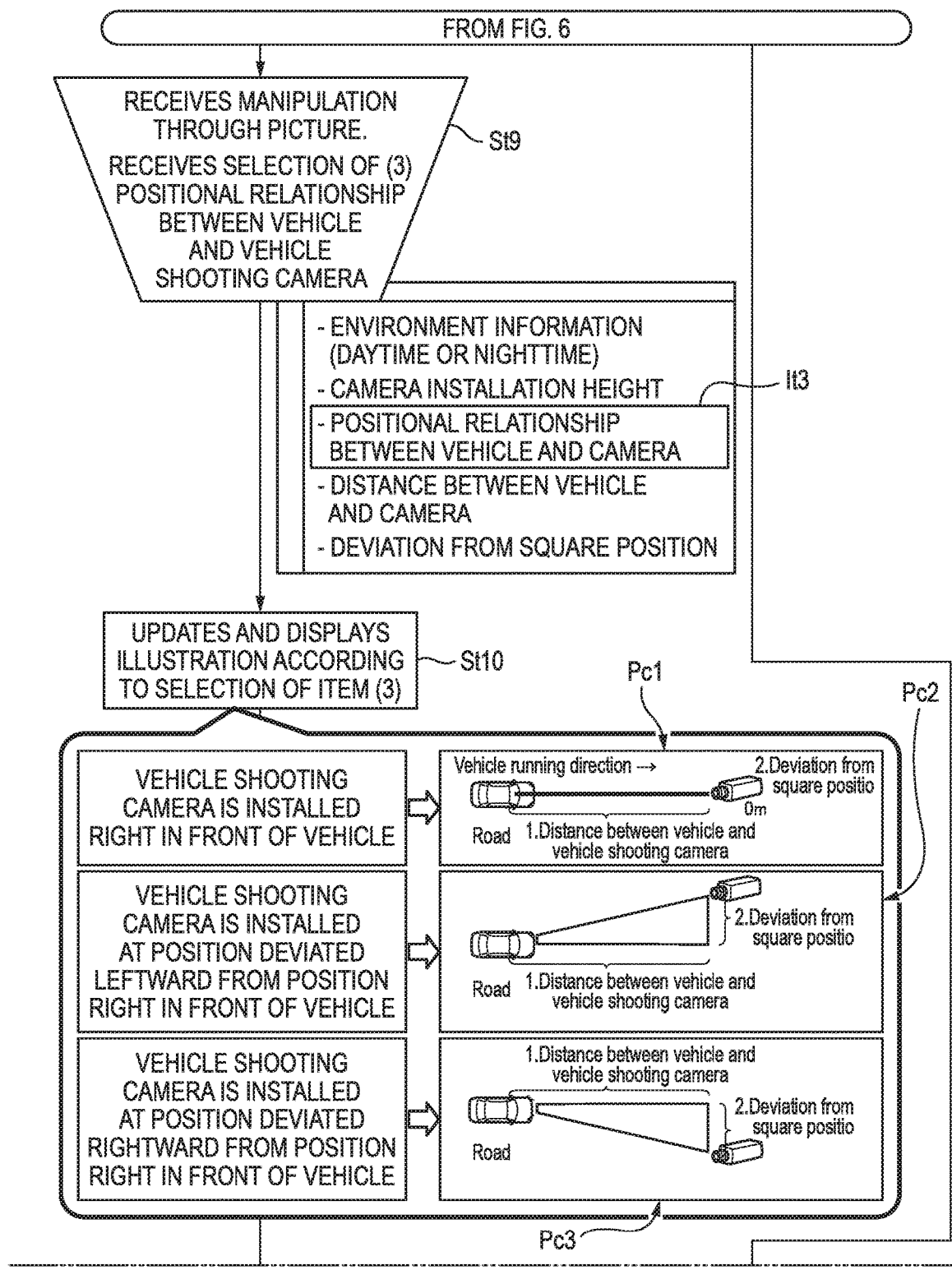
FIG. 7 is a second part, following FIG. 6, of the sequence diagram.

Referring to FIG. 7, at step St9, the worker checks a positional relationship between the vehicle VCL1 and the vehicle shooting camera 10 by referring to a design drawing or the like and manipulates the setting terminal 30 to select information indicating a positional relationship between the vehicle VCL1 and the vehicle shooting camera 10 through the installation setting picture WD1. At step St10, the setting terminal 30 updates a corresponding illustration (one of the above-mentioned three positional relationship images PC1, Pc2, and Pc3) in the installation setting picture WD1 and displays the updated I illustration in the installation setting picture WD1.

At step St11, the worker checks a distance between the vehicle VCL1 and the vehicle shooting camera 10 (i.e., a horizontal distance dy from the vehicle shooting camera 10 to the vehicle VCL1) by referring to a design drawing or the like and manipulates the setting terminal 30 to input or select information indicating the distance dy (see FIG. 4). At step St12, the worker checks a deviation of the vehicle shooting camera 10 from the square position (i.e., a lateral deviation dx (see FIG. 4) from the square position in the running direction of the vehicle VCL1 to the installation position of the vehicle shooting camera 10) by referring to a design drawing or the like and manipulates the setting terminal 30 to input information indicating the deviation from the square position.

Figure 8:
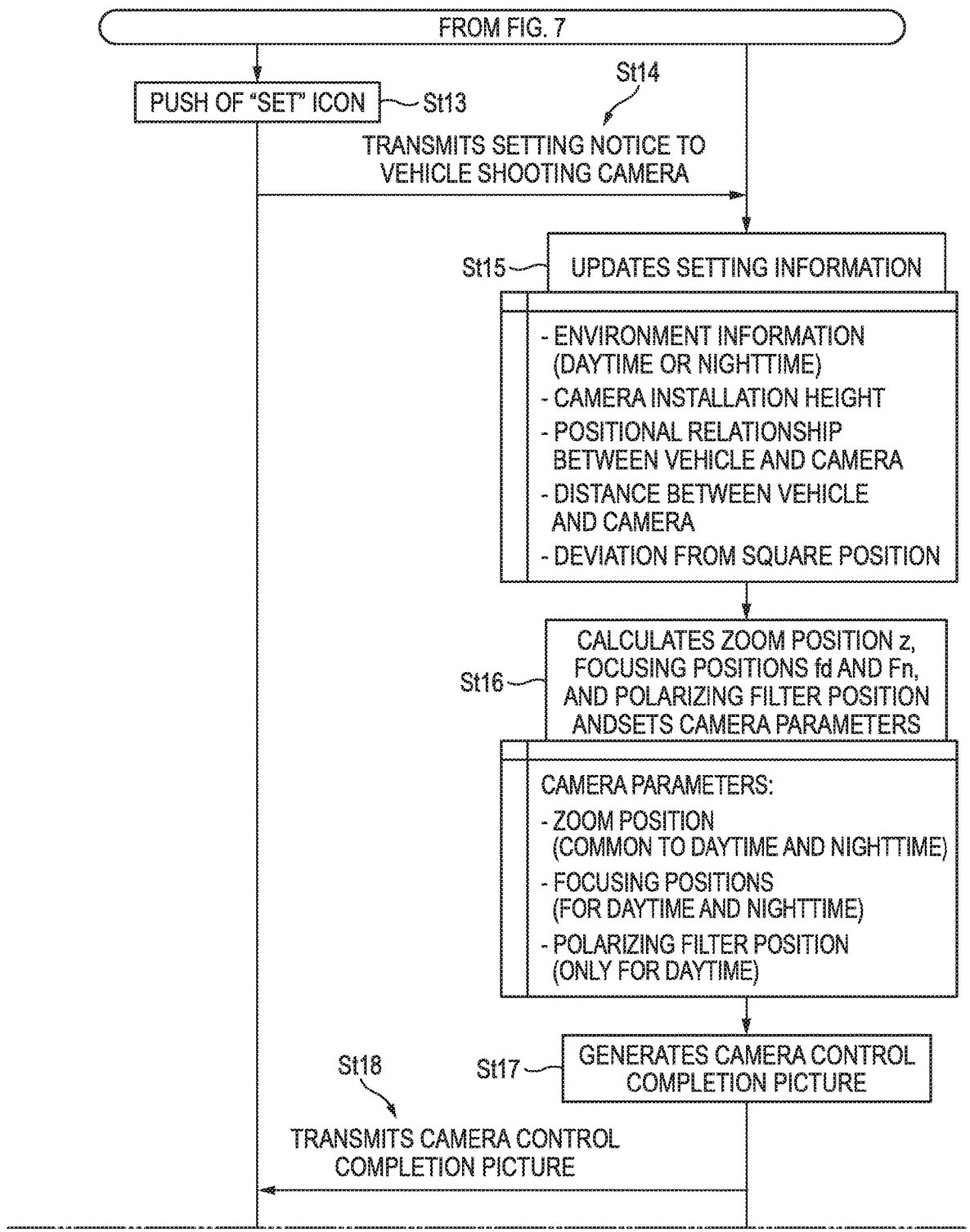
FIG. 8 is a third part, following FIG. 7, of the sequence diagram.

Referring to FIG. 8, after the execution of step St12, when a push of the "set" icon Stt1 is detected by the processor PRC1 at step St13, at step St14 the setting terminal 30 transmits, to the vehicle shooting camera 10, a camera parameters setting notice containing the data and information (examples of the term "parameters") that were input or selected at steps St7-St12. When receiving the camera parameters setting notice, at step St15 the vehicle shooting camera 10 stores the data and information that were input or selected at steps St7-St12 in the memory 12 or updates the setting information stored in the memory 12.

At step St16, the vehicle shooting camera 10 calculates a zoom position, focusing positions, and a polarizing filter position using the setting information stored at step St15 and sets them as camera parameters. At step St16, the vehicle shooting camera 10 calculates a focusing position in the daytime mode and a focusing position in the nighttime mode. The reason why a focusing position in the daytime mode and a focusing position in the nighttime mode are different from each other is that in the vehicle shooting camera 10 switching is made between the optical filters used in the daytime mode (more specifically, polarizing filter and IR cutting filter (see FIG. 13)) and the optical filter used in the nighttime mode (more specifically, bandpass filter (see FIG. 13)) according to environment information such as a time slot.

Step St16 will now be described in detail.

The processor 11 reads out current environment information, a vehicle shooting camera installation height h, a horizontal distance dy to a vehicle VCL1, a lateral deviation dx, and a prescribed angle-of-view width w from the memory 12. The processor 11 calculates an actual distance d (see FIG. 4) from the vehicle shooting camera 10 to a subject (e.g., vehicle VCL1) according to Equation (1). Symbol hc represents a height of the vehicle VCL1 in the case where the ground level is regarded as 0 m and is stored in the memory 12 in advance.

[Formula 1]

$$d = \sqrt{dx^2 + dy^2 + (h-hc)^2} \quad (1)$$

The processor 11 calculates a shooting angle of view $\theta x$ according to Equation (2) using the prescribed angle-of-view width w and the distance d that is a calculation result of Equation (1):

[Formula 2]

$$\theta x = \operatorname{atan}\left(\frac{\frac{w}{2}}{d}\right) \times 2 \quad (2)$$

The processor 11 determines a zoom position z corresponding to the shooting angle of view $\theta x$ calculated according to Equation (2) by referring to the angle-of-view table (see FIG. 5B) stored in the memory 12. The angle-of-view table is a table that correlates the zoom position z with the shooting angle of view. That is, the zoom lens position varies depending on the shooting angle of view Ox.

The processor 11 calculates a focusing position fd in the daytime mode and a focusing position fn in the nighttime mode using the distance d calculated according to Equation (1) and the zoom position z corresponding to the shooting angle of view Ox calculated according to Equation (2) by referring to the tracking table (see FIG. 5A) stored in the memory 12. The tracking table is a table showing focusing-attaining combinations of a zoom position and a focusing position determined on the basis of design values of the focusing lens and the zoom included in the lens block 17. For example, the tracking table of FIG. 5A shows that when the zoom lens is located at a zoom position 3 focusing on a subject (e.g., vehicle VCL1) that is distant from the vehicle shooting camera 10 by 5 m can be attained by moving the focusing lens to a focusing position 12.

More specifically, at step St16, the processor 11 calculates a far-side focusing position (described above) and a near-side focusing position (described above) on the basis of the distance d calculated according to Equation (1) by referring to values in the daytime mode in the tracking table and calculates a focusing position fd in the daytime mode by a known linear interpolation method using the far-side focusing position and the near-side focusing position. Likewise, at step St6, the processor 11 calculate a far-side focusing position and a near-side focusing position on the basis of the distance d calculated according to Equation (1) by referring to values in the nighttime mode in the tracking table and calculates a focusing position fn in the nighttime mode by the known linear interpolation method using the far-side focusing position and the near-side focusing position.

At step St16, the processor PRC1 calculates a deviation angle θp between a lane and the shooting surface of the vehicle shooting camera 10 according to Equation (3) using a horizontal distance dy to the vehicle VCL1 and a lateral deviation dx. The processor PRC1 calculates a polarizing filter position corresponding to the deviation angle θp using the polarizing filter rotation angle table stored in the memory 12 and the deviation angle θp calculated according to Equation (3). The vehicle shooting camera 10 may transmit, to the setting terminal 30, a calculation completion notice to the effect that step St16 has been completed. The polarizing filter rotation angle table is a table that correlates the deviation angle θp with the polarizing filter (PLF) rotation position indicating an optimum polarizing filter rotation angle for the deviation angle θp. The setting terminal 30 may be locked, that is, rendered in such a state as not to accept manipulation of a worker, during execution of step St16 (in other words, until reception of a calculation completion notice to the effect that step St16 has been completed).

[Formula 3]

$$\theta p = a\tan\left(\frac{dx}{dy}\right) \quad (3)$$

After the calculation of the camera parameters at step St16, the vehicle shooting camera 10 generates a camera control completion picture (not shown) at step St17 and transmits it to the setting terminal 30 at step St18. At step St19, the setting terminal 30 displays to the display/manipu-lation unit 34 the camera control completion picture received from the vehicle shooting camera 10.

When the installation setting picture WD1 is displayed in response to a worker manipulation and a push, by the worker, of the "yes" button of the option Ir6 of the fourth item "cross line display" shown in FIG. 3 for switching between display and non-display of guide lines is detected at step St20, at step St21 the setting terminal 30 generates a guide lines display request and transmits it to the vehicle shooting camera 10. When receiving the guide lines display request, the vehicle shooting camera 10 generates an installation setting picture WD1 in which guide lines GDE1 are displayed in the intra-vehicle face image FCIG1 and guide lines GDE2 are displayed in the license plate image LPIG1 at step St22 and transmits it to the setting terminal 30 step St23. At step St24, the setting terminal 30 displays, on the display/manipulation unit 34, the installation setting picture WD1 received from the vehicle shooting camera 10.

Assume that the vehicle shooting camera 10 has been moved physically by the worker who has seen the intra-vehicle face image FCIG1 having the guide lines GDE1 and the license plate image LPIG1 having the guide lines GDE2 and the shooting direction (more specifically, the pan direction and/or the tilt direction) of the vehicle shooting camera 10 has thereby been adjusted finely at step St25.

Figure 9:
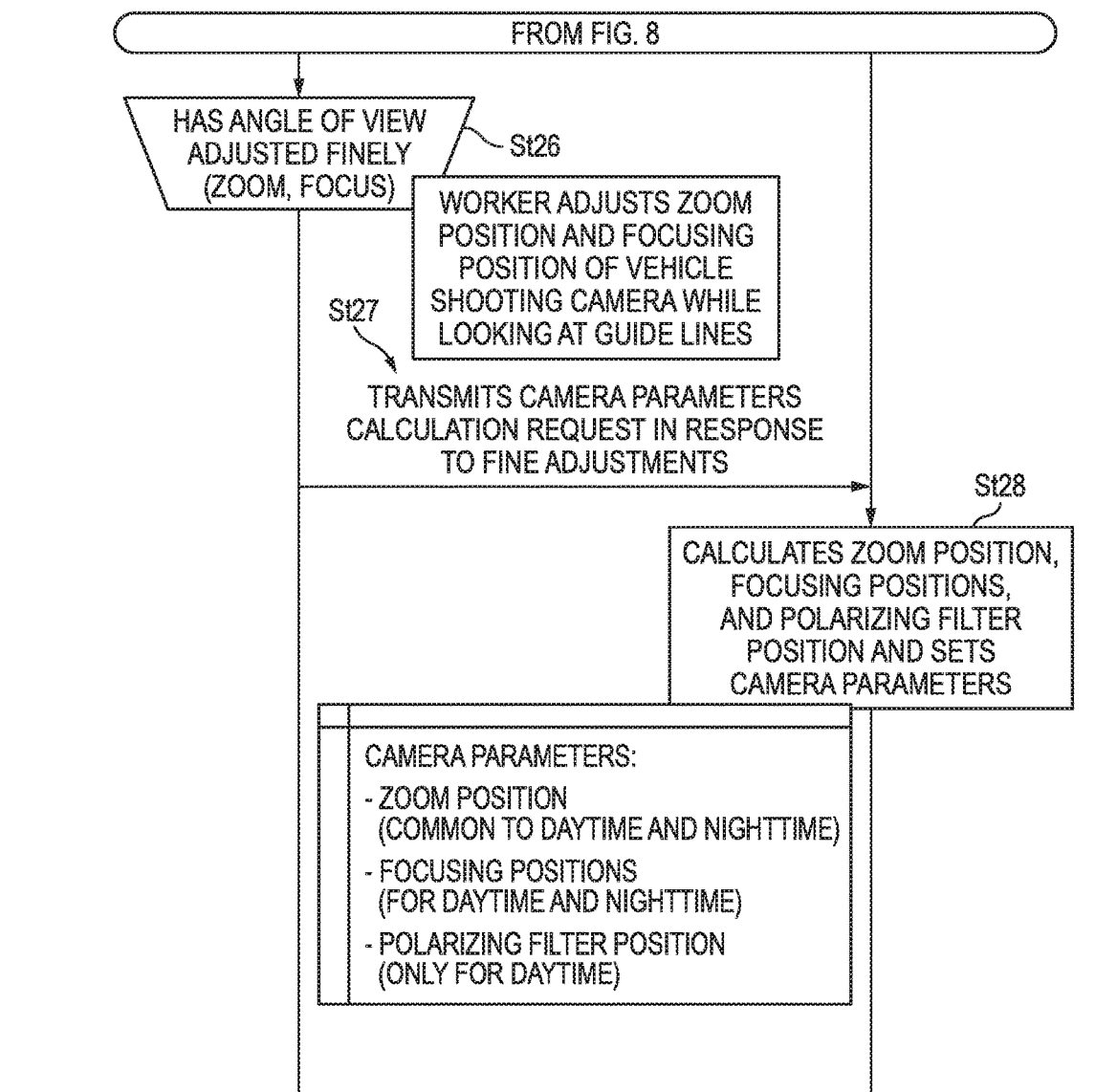
FIG. 9 is a fourth part, following FIG. 8, of the sequence diagram.

Referring to FIG. 9, assume that after the execution of step St25 the worker who has seen the intra-vehicle face image FCIG1 having the guide lines GDE1 and the license plate image LPIG1 having the guide lines GDE2 has performed manipulations for adjusting the zoom position and the focusing position finely (more specifically, manipulations on the adjustment icons It7 of the fifth item "manual zoom adjustment" and the adjustment icons It8 of the sixth item "manual focus adjustment") at step St26.

At step St27, the setting terminal 30 generates a request for calculating camera parameters (e.g., a zoom position common to the daytime mode and the nighttime mode, a focusing position for focusing on a subject (e.g., vehicle VCL1) in the daytime mode or the nighttime mode, and a PLF position indicating a rotation angle of the polarizing filter used in the daytime mode) according to the fine adjustment manipulations performed at step St26 and transmits the generated request to the vehicle shooting camera 10. Receiving the camera parameters calculation request, at step St28 the vehicle shooting camera 10 calculates camera parameters again according to the above fine adjustment manipulations in the same manner as at step St16.

At step St29, the vehicle shooting camera 10 reads out data that are necessary for determining shooting conditions for actual use. More specifically, these data are the camera parameters (e.g., the zoom position common to the daytime mode and the nighttime mode, the focusing position for focusing on a subject (e.g., vehicle VCL1) in the daytime mode or the nighttime mode, the PLF position indicating the rotation angle of the polarizing filter used in the daytime mode), the current environment information, the camera installation height, the positional relationship between a vehicle and the camera, the distance between a vehicle and the vehicle shooting camera 10, and the deviation from the square position.

At step St30, the vehicle shooting camera 10 determines and sets shooting conditions to be used in the daytime mode (i.e., the above-mentioned first capturing conditions) and shooting conditions to be used in the nighttime mode (i.e., the above-mentioned second capturing conditions).

Figure 10:
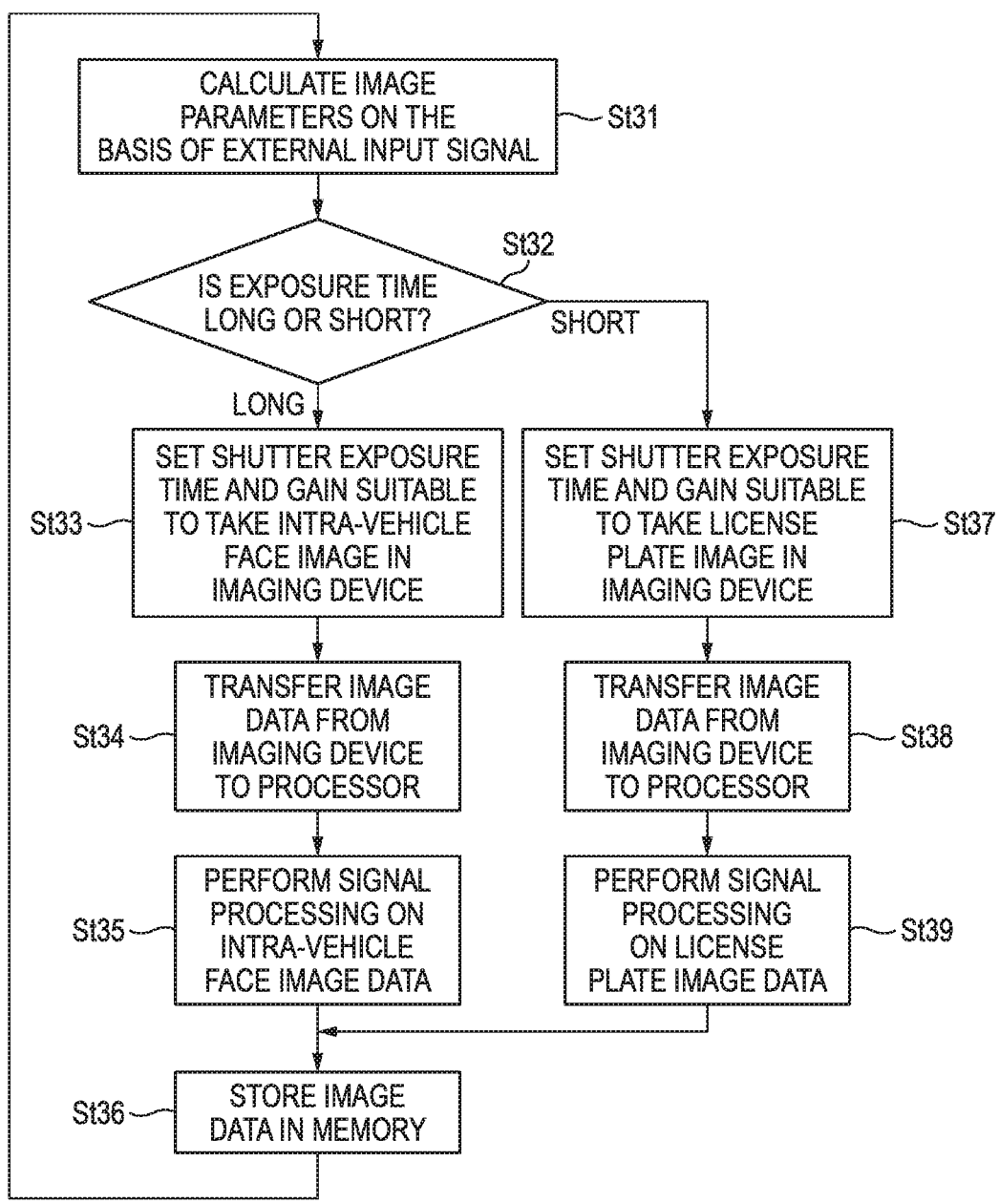
FIG. 10 is a flowchart showing an example procedure of a capturing operation of the vehicle shooting camera.

FIG. 10 is a flowchart showing an example procedure of a capturing operation of the vehicle shooting camera 10.

Figure 11:
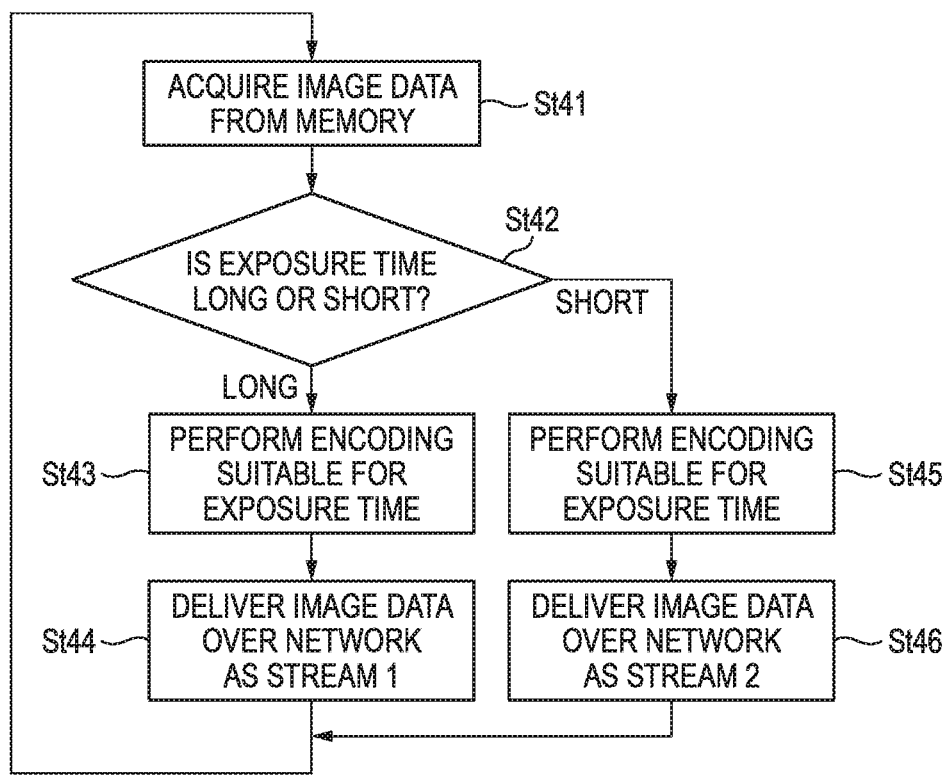
FIG. 11 is a flowchart showing an example procedure of a data transmission operation of the vehicle shooting camera.
Figure 12:
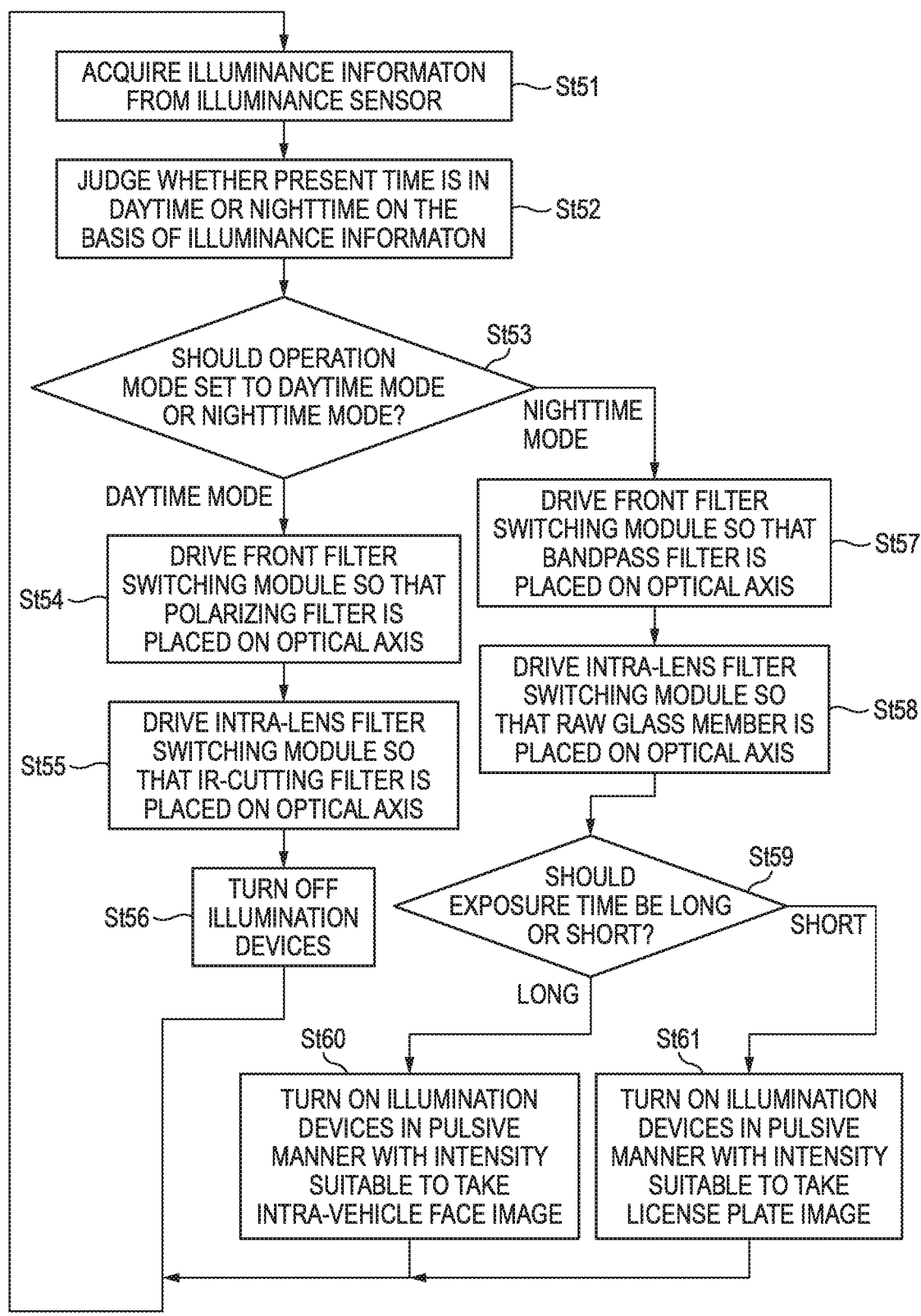
FIG. 12 is a flowchart showing an example procedure of an illumination control operation of the vehicle shooting camera.

FIG. 11 is a flowchart showing an example procedure of a data transmission operation of the vehicle shooting camera 10. FIG. 12 is a flowchart showing an example procedure of an illumination control operation of the vehicle shooting camera 10. FIG. 13 is a table showing examples of various kinds operation controls performed in each of the daytime mode and the nighttime mode.

For example, the process shown in FIG. 10 is executed repeatedly from power-on of the vehicle shooting camera 10 to its power-off. Referring to FIG. 10, at step St31, the processor 11 calculates image parameters of the first capturing conditions and image parameters of the second capturing conditions on the basis of an external input signal received via the communication unit 13 and sets calculation results (image parameters) in the memory 12. The vehicle shooting camera 10 performs capturing while switching between a license plate image and an intra-vehicle face image time-divisionally (e.g., frame by frame). For example, the processor 11 takes license plate images as odd-numbered frames and takes intra-vehicle face images as even-numbered frames.

At step St32, the processor 11 judges whether the exposure time of the electronic shutter of the imaging device 14 is "long" or "short."

To take an even-numbered frame image, the processor 11 judges that the exposure time of the electronic shutter for an intra-vehicle face image is "long" at step St32 and sets image parameters (e.g., electronic shutter exposure time and gain) suitable to take an intra-vehicle face image in the imaging device 14 at step St33. At step St34, the imaging device 14 transfers data of the intra-vehicle face image taken using the image parameters that were set at step St33. At step St35, the processor 11 performs prescribed signal processing (e.g., noise elimination, white balance adjustment, and image compression) on the data of the intra-vehicle face image received from the imaging device 14. At step St36, the processor 11 stores the data of the intra-vehicle face image that have been subjected to the signal processing in the memory 12 (temporary storage). After the execution of step St36, the process being executed in the vehicle shooting camera 10 returns to step St31.

On the other hand, to take an odd-numbered frame image, the processor 11 judges that the exposure time of the electronic shutter for a license plate image is "short" at step St32 and sets image parameters (e.g., electronic shutter exposure time and gain) suitable to take a license plate image in the imaging device 14 at step St37. At step St38, the imaging device 14 transfers data of the license plate image taken using the image parameters that were set at step St37. At step St39, the processor 11 performs prescribed signal processing (e.g., noise elimination, white balance adjustment, and image compression) on the data of the license plate image received from the imaging device 14. At step St36, the processor 11 stores the data of the license plate image that have been subjected to the signal processing in the memory 12 (temporary storage).

By executing the above process, by switching between image parameters for an intra-vehicle face image and image parameters for a license plate frame by frame, the vehicle shooting camera 10 can generate intra-vehicle face images taken using image parameters suitable to capture the face of a person existing in a vehicle and can also generate license plate images taken using image parameters suitable to capture a license plate.

For example, the process shown in FIG. 11 is executed repeatedly from power-on of the vehicle shooting camera 10 to its power-off. Referring to FIG. 11, at step St41 the processor 11 reads out data of an intra-vehicle face image or a license plate image stored at step St36 (temporary storage).

At step St42, the processor 11 judges whether the exposure time of the electronic shutter of the imaging device 14 corresponding to the image data acquired at step St41 is "long" or "short."

If judging that the exposure time is "long," at step St43 the processor 11 performs encoding suitable for the exposure time. For example, to acquire a clear image of the face of a person existing in a vehicle through the windshield, the processor 11 performs encoding at a low compression rate. At step St44, the processor 11 delivers intra-vehicle face image data obtained by the encoding at step St43 to a destination server (not shown) via the communication unit 13 as stream 1. Then the process of the vehicle shooting camera 10 returns to step St41.

On the other hand, if judging that the exposure time is "short," at step St45 the processor 11 performs encoding suitable for the exposure time. For example, to acquire an image of a license plate, the processor 11 may perform encoding at a high compression rate. At step St46, the processor 11 delivers license plate data obtained by the encoding at step St45 to the destination server (not shown) via the communication unit 13 as stream 2. Then the process of the vehicle shooting camera 10 returns to step St41.

By executing the above process, the vehicle shooting camera 10 can encode intra-vehicle face image data or license plate data at a compression rate suitable for the data according to an exposure time of the electronic shutter of the imaging device 14 and deliver resulting data to the destination server (not shown).

The table TBL1 shown in FIG. 13 is registered in, for example, the memory 12 in advance. In the daytime mode, the table TBL1 is given instruction information instructing that the polarizing filter (not shown) should be placed on the optical axis in the front filter switching module 21, the IR cutting filter should be placed on the optical axis in the intra-lens filter switching module 19, and the nighttime short-wavelength illumination devices 16 should be turned off. On the other hand, in the nighttime mode, the table TBL1 is given instruction information instructing that the bandpass filter (not shown) should be placed on the optical axis in the front filter switching module 21, the raw glass member should be placed on the optical axis in the intra-lens filter switching module 19, and the nighttime short-wavelength illumination devices 16 should be turned on. Switching between the daytime mode and the nighttime mode (see FIG. 13) is made by the processor 11 according to an instruction to the table TBL1.

The process shown in FIG. 12 is executed repeatedly from power-on of the vehicle shooting camera 10 to its power-off. Referring to FIG. 12, at step St51 the processor 11 acquires ambient illuminance information detected by the illuminance sensor S1. At step St52, the processor 11 judges whether the present time is in the daytime (e.g., in the morning or afternoon) or in the nighttime (e.g., in the evening or night) on the basis of illuminance information acquired at step St51.

At step St53, the processor 11 judges on the basis of the judgment result of step St52 whether to set the operation mode of the vehicle shooting camera 10 to the daytime mode or the nighttime mode. For example, the memory 12 is stored with a threshold value corresponding to a prescribed illuminance and the processor 11 sets the operation mode to the daytime mode if the ambient illuminance is higher than the threshold value and sets the operation mode to the nighttime mode if the ambient illuminance is lower than the threshold value.

If it is judged at step St53 that the operation mode should be set to the daytime mode, at step St54 the processor 11 generates a control instruction to perform daytime mode processing according to the table TBL1 shown in FIG. 13, sends it to the front filter switching driver 22, and thereby drives the front filter switching module 21 via the front filter switching driver 22. In the daytime mode, the front filter switching module 21 moves the polarizing filter (not shown) so that it is placed on the optical axis. At step St55, the processor 11 also sends the daytime mode control instruction to the intra-lens filter switching driver 20 and thereby drives the intra-lens filter switching module 19 via the intra-lens filter switching driver 20. In the daytime mode, the intra-lens filter switching module 19 moves the IR-cutting filter so that it is placed on the optical axis to make an RGB image taken by the imaging device 14 clearer.

At step St56, the processor 11 also sends the daytime mode control instruction to the illumination driver 15 and thereby turns off the nighttime short-wavelength illumination devices 16 via the illumination driver 15. After the execution of step St56, the process of the vehicle shooting camera 10 returns to step St51.

On the other hand, if it is judged at step St53 that the operation mode should be set to the nighttime mode, at step St57 the processor 11 generates a control instruction to perform nighttime mode processing according to the table TBL1 shown in FIG. 13, sends it to the front filter switching driver 22, and thereby drives the front filter switching module 21 via the front filter switching driver 22. In the nighttime mode, the front filter switching module 21 moves the bandpass filter (not shown) so that it is placed on the optical axis. At step St58, the processor 11 also sends the nighttime mode control instruction to the intra-lens filter switching driver 20 and thereby drives the intra-lens filter switching module 19 via the intra-lens filter switching driver 20. In the nighttime mode, the intra-lens filter switching module 19 moves the raw glass member so that it is placed on the optical axis to allow IR light to shine on the vehicle shooting camera 10.

At step St59, the processor 11 judges whether the exposure time of the electronic shutter of the imaging device 14 at the time of capturing should be "long" or "short."

In taking an even-numbered frame image, at step St59 the processor 11 judges that the exposure time of the electronic shutter should be long" so as to be suitable to take an intra-vehicle face image. At step St60, the processor 11 sends to the illumination driver 15 a control instruction of image parameters (e.g., intensity of IR light to be emitted from the nighttime short-wavelength illumination devices 16) suitable to take an intra-vehicle face image in the nighttime mode and turns on the nighttime short-wavelength illumination devices 16 in a pulsive manner via the illumination driver 15 according to this control instruction. After the execution of step St60, the process of the vehicle shooting camera 10 returns to step St51.

On the other hand, in taking an odd-numbered frame image, at step St59 the processor 11 judges that the exposure time of the electronic shutter should be "short" so as to be suitable to take a license plate image. At step St61, the processor 11 sends to the illumination driver 15 a control instruction of image parameters (e.g., intensity of IR light to be emitted from the nighttime short-wavelength illumination devices 16) suitable to take a license plate image in the nighttime mode and turns on the nighttime short-wavelength illumination devices 16 in a pulsive manner via the illumination driver 15 according to this control instruction. After the execution of step St61, the process of the vehicle shooting camera 10 returns to step St51.

By executing the above process, since the vehicle shooting camera 10 switches the front filter switching module 21, the intra-lens filter switching module 19, and the nighttime short-wavelength illumination devices 16 (on/off switching) adaptively according to whether the operation mode is the daytime mode or the nighttime mode, high-accuracy capturing can be realized in each of the daytime mode or the nighttime mode and intra-vehicle face images and license plate images of a vehicle as a subject can be generated.

As described above, the camera parameter setting system 1 according to the embodiment is equipped with at least one vehicle shooting camera 10 and the setting terminal 10 in such a manner that they can communicate with each other. In installation work, the vehicle shooting camera 10 captures a vehicle including a person existing therein and a license plate of it and included in an angle of view from an installation position and transmits to the setting terminal 30 a resulting image of the person and a resulting image of the license plate in response to a setting request from the setting terminal 30. The setting terminal 30 displays an installation setting picture WD1 including the image of the person and the image of the license plate, receives input of camera parameters corresponding to one of the daytime mode and the nighttime mode of the vehicle shooting camera 10 according to manipulations of a worker, and transmits the input camera parameters to the vehicle shooting camera 10. The vehicle shooting camera 10 derives camera parameters corresponding to the one operation mode on the basis of the camera parameters transmitted from the setting terminal 30 and sets the derived camera parameters.

With this configuration, the camera parameter setting system 1 can assist the setting of proper camera parameters for the daytime and those for the nighttime in a short time in installing a monitoring camera such as the vehicle shooting camera 10 so that it can capture a road.

The vehicle shooting camera 10 derives camera parameters corresponding to other operation mode on the basis of the camera parameters transmitted from the setting terminal 30 and sets camera parameters for the daytime mode and camera parameters for the nighttime mode. With this measure, the camera parameter setting system 1 can derive and set, at one time, camera parameters for the daytime mode and camera parameters for the nighttime mode to be used when the vehicle shooting camera 10 performs capturing in the daytime mode and the nighttime mode, respectively.

The vehicle shooting camera 10 is equipped with the lens block 17 having at least the focusing lens and the memory 12 that is stored with focusing position information (e.g., tracking table shown in FIG. 5A) that correlates plural prescribed distances with respective focusing-attaining positions of the focusing lens in each of the daytime and the nighttime, The vehicle shooting camera 10 derives a position of the focusing lens for the daytime mode and a position of the focusing lens for the nighttime mode on the basis of the focusing position information and a distanced d to a subject. With this measure, the camera parameter setting system 1 can calculate and set a focusing position for the daytime mode and a focusing position for the nighttime mode properly according to a distance from an installation position of the vehicle shooting camera 10 and a subject (e.g., a vehicle VCL1 existing in the angle of view).

The setting terminal 30 displays angle of view adjustment guide lines (e.g., guide lines DGE1 and GDE2) in at least one of the image of the person and the image of the license plate in response a manipulation of the worker on the installation setting picture WD1. With this measure, in installing the vehicle shooting camera 10, the worker can judge in a simple manner whether the angle of view of the vehicle shooting camera 10 has been set properly and adjust the shooting angle of view properly by moving the vehicle shooting camera 10 in the pan direction or the tilt direction when necessary.

The setting terminal 30 transmits a request for adjusting the focusing position of the camera in response to a manipulation of the worker on the installation setting picture WD1 in which the image of the person with the angle of view adjustment guide lines and the image of the license plate with the angle of view adjustment guide lines. The vehicle shooting camera 10 changes and updates the focusing position in response to the adjustment request. With this measure, the worker who has seen the intra-vehicle face image FCIG1 with the guide lines GDE1 and the license plate image LPIG1 with the guide lines GDE2 displayed in the installation setting picture WD1 of the setting terminal 30 can judge in a simple manner how good the image of the subject (e.g., vehicle VCL1) has been taken (e.g., whether the zoom magnification is proper or focusing is attained) and, if necessary, fine-adjust the visibility of the intra-vehicle face image FCIG1 and the license plate image LPIG1 properly using at least one of the zoom magnification and the focusing position.

Next, a modified operation procedure for adjusting the zoom position and the focusing positions of the vehicle shooting camera 10 using example pictures other than the installation setting picture WD1 shown in FIG. 3 will be described with reference to FIGS. 14-20.

[Step 0: Setting-Up of Wireless Communication]

Figure 14:
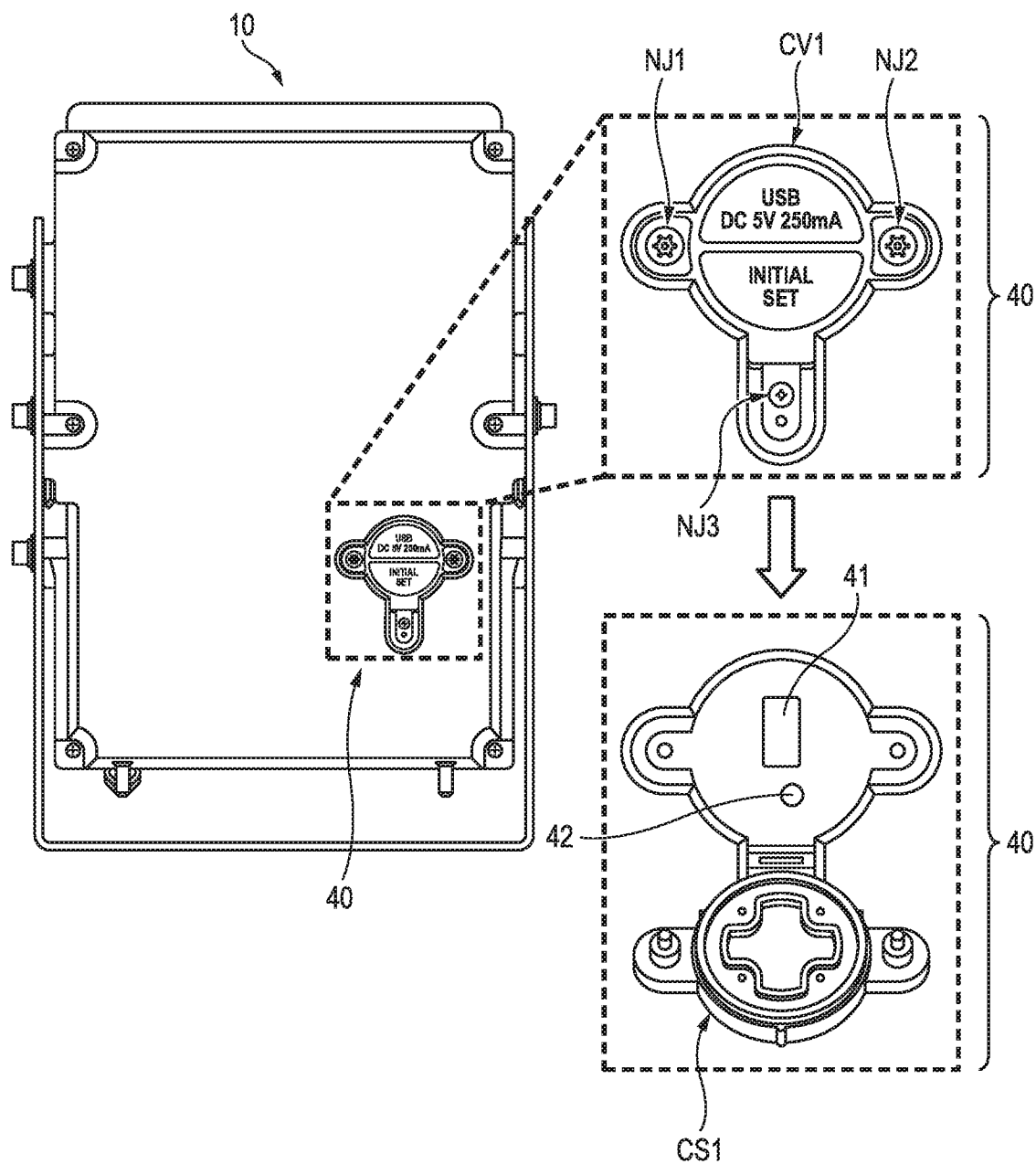
FIG. 14 shows example appearances of a back body and a detachable back lid of the vehicle shooting camera.

First, setting-up of wireless communication between the vehicle shooting camera 10 and the setting terminal 30 will be described with reference to FIG. 14. FIG. 14 shows example appearances of a portion 40 of a back body and a detachable back lid CV1 of the vehicle shooting camera 10.

As shown in FIG. 14, the back lid CV1 which is detachable from the back body is fixed to the portion 40 (e.g., bottom-right portion) of the back body of the vehicle shooting camera 10 by screws NJ1, NJ2, and NJ3 at three respective positions. For example, when a worker is performing initial settings (e.g., installation) on the vehicle shooting camera 10 in a state that the back lid CV1 is fixed to the portion 40 only by the screw NJ3 (the two screws NI1 and NJ2 are removed), a connector 41 for a USB-type access point UADP1 (see FIG. 20) and an initialization button 42 are exposed which would otherwise be covered with the back lid CV1. To protect the connector 41 and the initialization button 42 even while the back lid CV1 is screwed at the three positions, a cushion member CS1 made of an elastic material such as rubber is provided around a central portion of the back lid CV1.

For example, to perform initial settings (e.g., installation) on the vehicle shooting camera 10, the worker removes the two screws NI1 and NJ2 from the back lid CV1 and opens the back lid CV1 from the back body to expose the connector 41. Then the worker connects the USB-type access point UADP1 to the connector 41. The access point UADP1, which enables a wireless LAN communication of WiFi (registered trademark), has a function of relaying a wireless communication between the vehicle shooting camera 10 and the setting terminal 30. As a result, the vehicle shooting camera 10 comes to be able to perform a wireless communication (e.g., wireless LAN communication) with the setting terminal 30 via the access point UADP1.

[Step 1: Input of Measured Positional Relationship Information]

Figure 15:
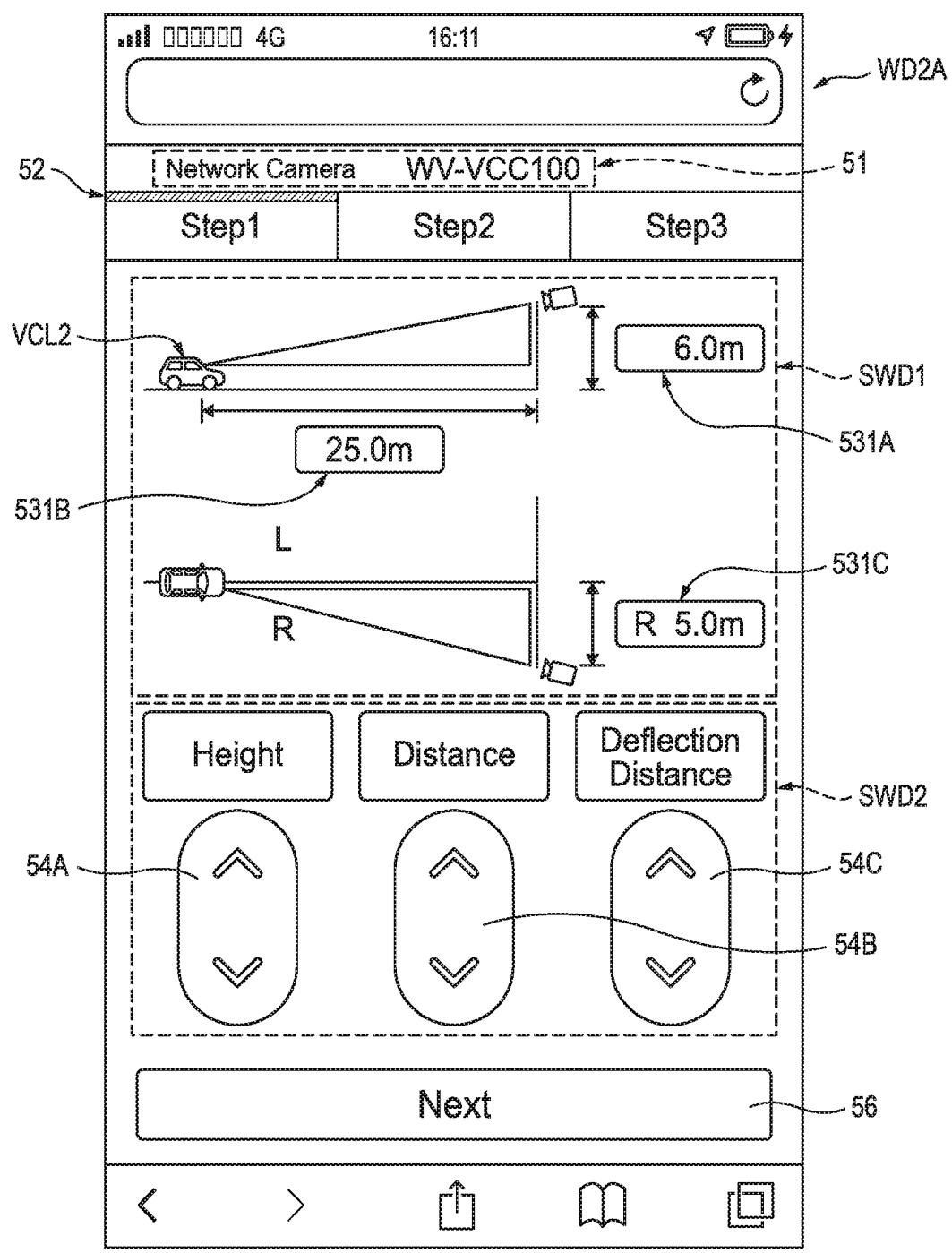
FIG. 15 shows an example first picture to be displayed on the setting terminal at Step 1 of a procedure for adjusting the zoom position and the focusing positions of the vehicle shooting camera.
Figure 16:
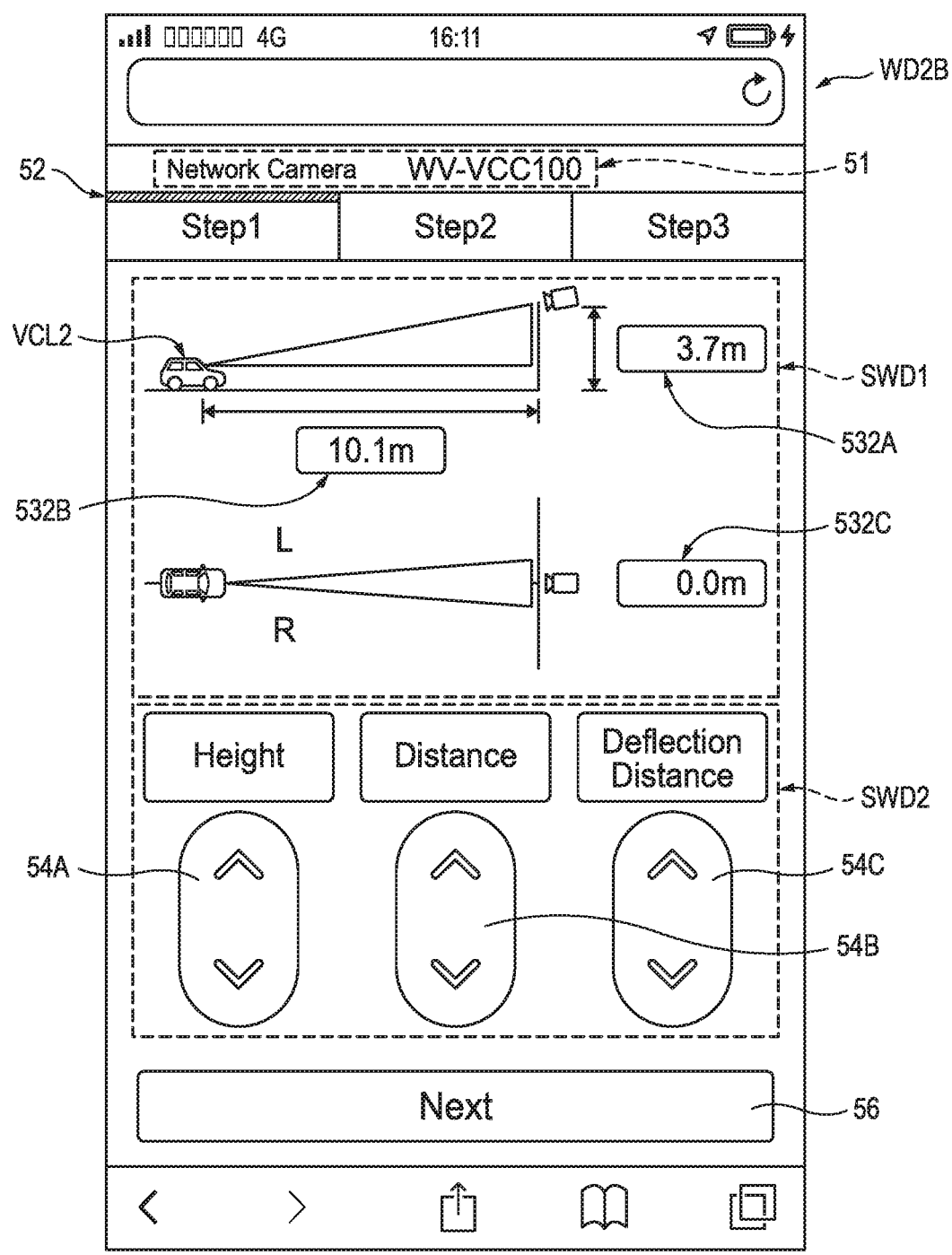
FIG. 16 shows an example second picture to be displayed on the setting terminal at Step 1 of the procedure for adjusting the zoom position and the focusing positions of the vehicle shooting camera.
Figure 17:
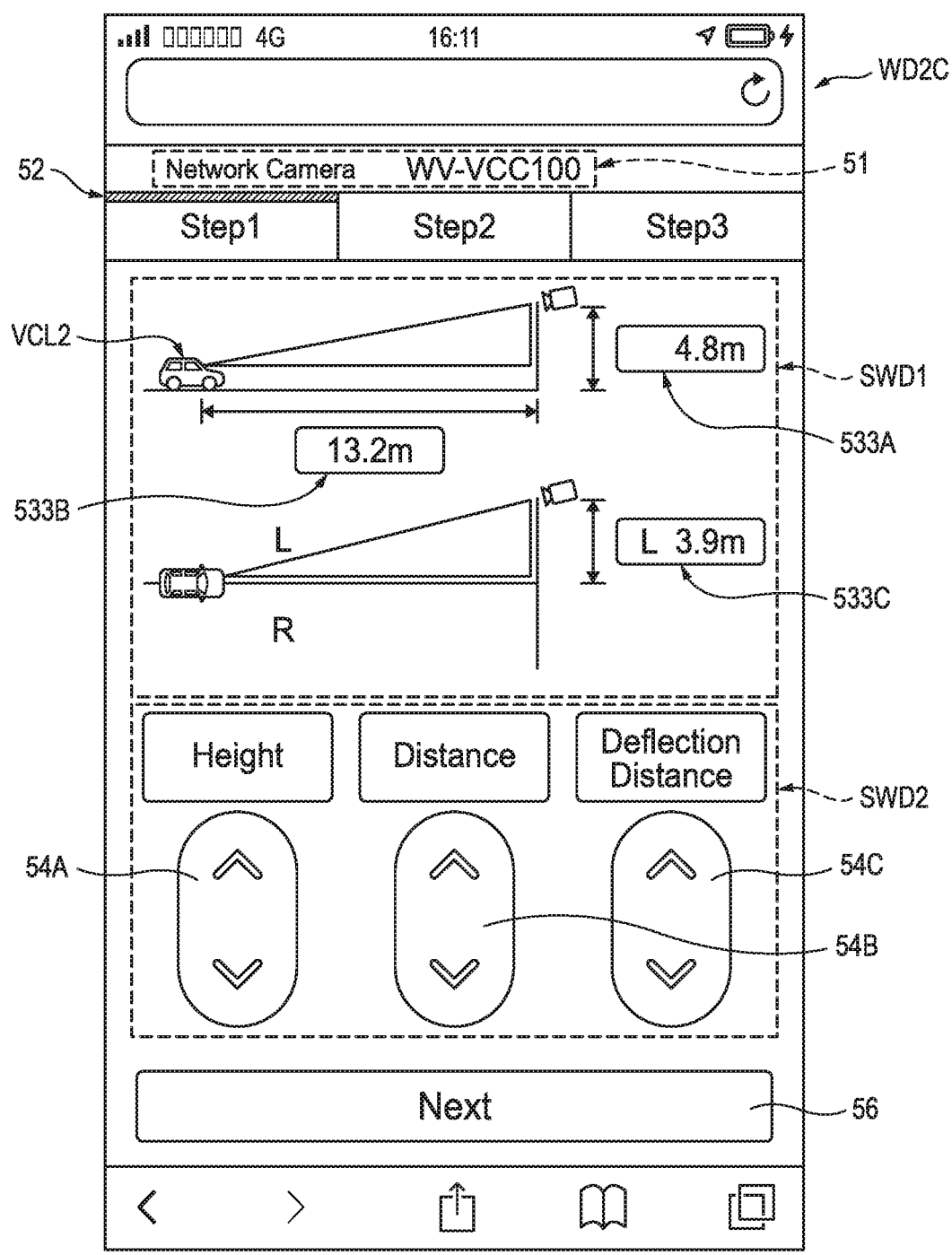
FIG. 17 shows an example third picture to be displayed on the setting terminal at Step 1 of the procedure for adjusting the zoom position and the focusing positions of the vehicle shooting camera.

After the setting-up of wireless communication between the vehicle shooting camera 10 and the setting terminal 30, the worker inputs or selects positional relationship information (see FIGS. 15-17) indicating a positional relationship between the vehicle shooting camera 10 and a vehicle (subject) on which focusing should be made. FIG. 15 shows an example first picture to be displayed on the setting terminal 30 at Step 1 of the procedure for adjusting the zoom position and the focusing positions of the vehicle shooting camera 10. FIG. 16 shows an example second picture to be displayed on the setting terminal 30 at Step 1 of the procedure for adjusting the zoom position and the focusing positions of the vehicle shooting camera 10. FIG. 17 shows an example third picture to be displayed on the setting terminal 30 at Step 1 of the procedure for adjusting the zoom position and the focusing positions of the vehicle shooting camera 10. In descriptions that will be made with reference to FIGS. 16 and 17, elements having the same ones in FIG. 15 will be given the same symbols as the latter and will be described in a simplified manner or will not be described at all, that is, only differences will be described.

The setting terminal 30 displays an input picture WD2A (see FIG. 15), an input picture WD2B (see FIG. 16), or an input picture WD2C (see FIG. 17) for input of positional relationship information to be used for adjustment of the zoom position and the focusing position of the vehicle shooting camera 10 in response to a manipulation of the worker. First, the input picture WD2A will be described as a representative example.

The input picture WD2A shown in FIG. 15 is a display picture for receiving input, by manipulations of the worker, of positional relationship information (i.e., an installation height of the vehicle shooting camera 10 ("height"), a distance between the vehicle and the vehicle shooting camera 10 ("distance"), and a deviation from the square position ("deflection distance")). The deviation from the square position is a distance (deviation), in the road width direction, of an installation position of the vehicle shooting camera 10 from the square position in the running direction of a vehicle VCL2 (subject).

More specifically, a name display region 51, an order display region 52, a positional relationship information input region SWD1, a manipulation region SWD2, and a "next" button 56 are arranged in the input picture WD2A.

A name of the vehicle shooting camera 10 as an adjustment target is displayed in the name display region 51. For example, the name of the vehicle shooting camera 10 is obtained by acquiring information of the vehicle shooting camera 10 when the setting terminal 30 has established a wireless communication with the vehicle shooting camera 10.

The order of steps (more specifically, Step 1, Step 2, and Step 3) of the procedure for adjusting the zoom position and the focusing positions of the vehicle shooting camera 10 and a bar indicating a degree of progress of the adjustment are displayed in the order display region 52. In the example of FIG. 15, the bar indicates that Step 1 is being executed currently.

Illustrations showing definitions of the installation height of the vehicle shooting camera 10, the distance between the vehicle and the vehicle shooting camera 10, and the deviation from the square position are displayed in the positional relationship information input region SWD1. In the example of FIG. 15, "6.0 m," "25.0 m," and "R 5.0 m" have been input in an input region 531A of the installation height of the vehicle shooting camera 10, an input region 531B of the distance between the vehicle and the vehicle shooting camera 10, and an input region 531C of the deviation from the square position as positional relationship information indicating a positional relationship between the vehicle shooting camera 10 and the vehicle VCL2 by manipulations of the operator using the input icons 54A, 54B, and 54C, respectively. These values are values that were measured in advance by workers. The character "R" of "R 5.0 m" of the deviation from the square position is the abbreviation of the term "right" and indicates that the vehicle shooting camera 10 is being installed in front of and on the top-right of the vehicle VCL2.

Input icons 54A, 54B, and 54C for assisting the worker to make inputs for the installation height of the vehicle shooting camera 10, the distance between the vehicle and the vehicle shooting camera 10, and the deviation from the square position are displayed in the manipulation region SWD2, respectively.

The "next" button 56 has a function of commanding the end of Step 1. If the "next" button 56 is pushed by a manipulation of the worker, the setting terminal 30 transmits a Step 1 end notice including input values (examples of the term "parameters") of the installation height of the vehicle shooting camera 10, the distance between the vehicle and the vehicle shooting camera 10, and the deviation from the square position to the vehicle shooting camera 10 via the access point UADP1.

In the example input picture WD2B shown in FIG. 16, "3.7 m," "10.1 m," and "0.0 m" have been input in the input region 531A of the installation height of the vehicle shooting camera 10, the input region 531B of the distance between the vehicle and the vehicle shooting camera 10, and the input region 531C of the deviation from the square position as positional relationship information indicating a positional relationship between the vehicle shooting camera 10 and the vehicle VCL2 by manipulations of the operator using the input icons 54A, 54B, and 54C, respectively. These values are values that were measured in advance by workers. The value "0.0 m" of the deviation from the square position indicates that the vehicle shooting camera 10 is being installed in top-front of (right in front of) the vehicle VCL2.

In the example input picture WD2B shown in FIG. 17, "4.8 m," "13.2 m," and "L 3.9 m" have been input in the input region 531A of the installation height of the vehicle shooting camera 10, the input region 531B of the distance between the vehicle and the vehicle shooting camera 10, and the input region 531C of the deviation from the square position, respectively. These values are values that were measured in advance by workers. The character "L" of "L 3.9 m" of the deviation from the square position is the abbreviation of the term "left" and indicates that the vehicle shooting camera 10 is being installed in front of and on the top-left of the vehicle VCL2.

Figure 18:
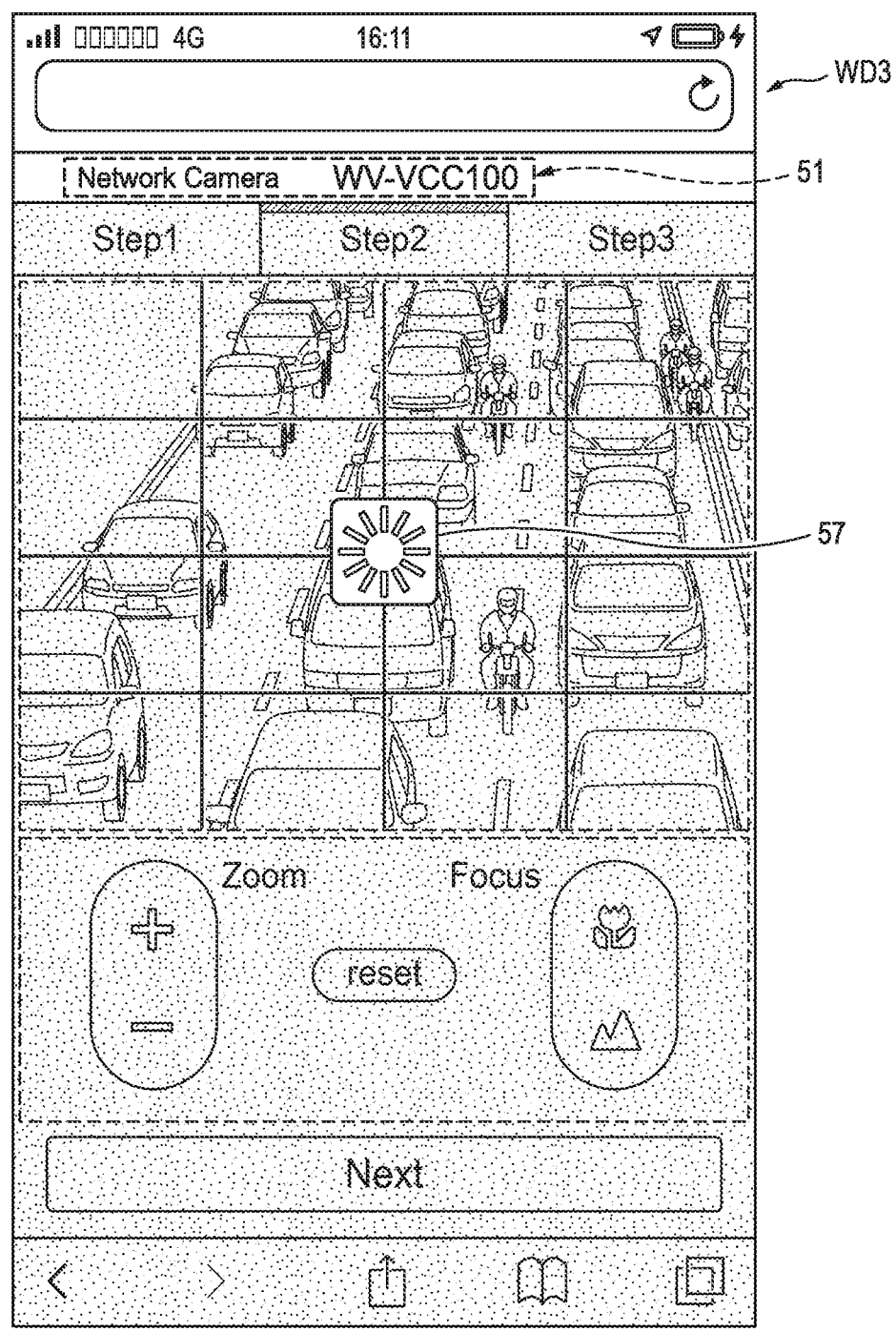
FIG. 18 shows an example waiting picture to be displayed on the setting terminal between Step 1 and Step 2.

FIG. 18 shows an example waiting picture WD3 to be displayed on the setting terminal 30 between Step 1 and Step 2. When detecting a push by the operator of the "next" button 56 in one of the input pictures shown in FIGS. 15-17, the setting terminal 30 transmits a Step 1 end notice as mentioned above to the vehicle shooting camera 10 via the access point UADP1. Before a video taken is transmitted from the vehicle shooting camera 10 at Step 2, the setting terminal 30 displays the waiting picture WD3 shown in FIG. 18 temporarily. An icon 57 indicating a waiting state is displayed at the center of the waiting picture WD3.

[Step 2: Adjustment of zoom position and focusing positions]

When receiving a Step 1 end notice (described above) from the setting terminal 30 via the access point UADP1, the vehicle shooting camera 10 derives (calculates) a zoom position z, focusing positions fd and fn, and a PLF position corresponding to a deviation angle $\theta p$ using the input installation height of the vehicle shooting camera 10, distance between the vehicle and the vehicle shooting camera 10, and deviation from the square position (refer to step St16 in FIG. 8). Step St16 will not be described in detail here. The vehicle shooting camera 10 transmits data of a video taken at the installation position after calculation results have been set as camera parameters to the setting terminal 30 via the access point UADP1. The setting terminal 30 receives the data of the video transmitted from the vehicle shooting camera 10 and displays it in an adjustment picture WD4 (see FIG. 19) at Step 2 of the procedure for adjusting the zoom position and the focusing positions of the vehicle shooting camera 10.

Figure 19:
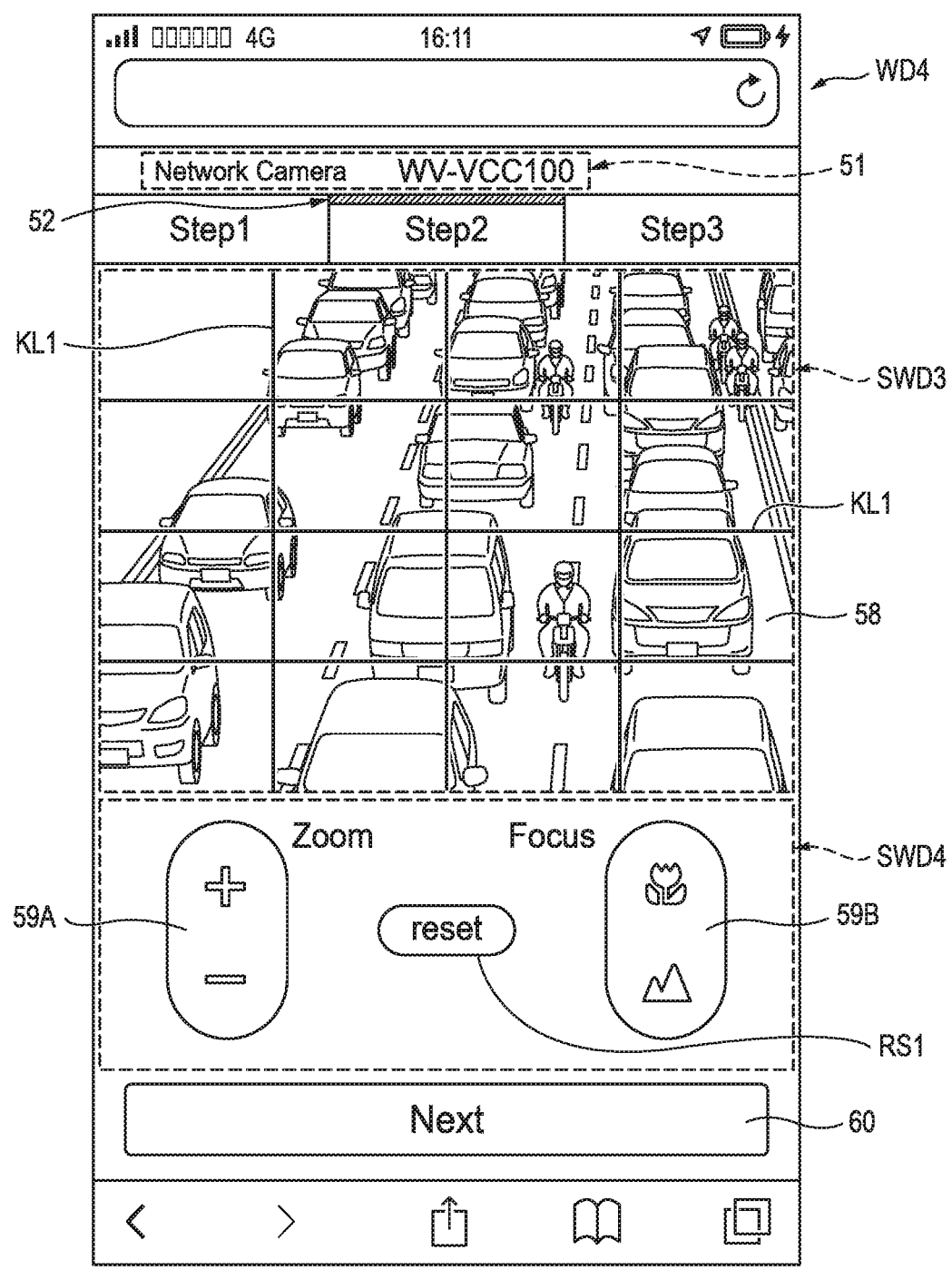
FIG. 19 shows an example adjustment picture to be displayed on the setting terminal at Step 2 of the procedure for adjusting the zoom position and the focusing positions of the vehicle shooting camera.

FIG. 19 shows an example adjustment picture WD4 to be displayed at Step 2 of the procedure for adjusting the zoom position and the focusing positions of the vehicle shooting camera 10. In descriptions that will be made with reference to FIG. 19, elements having the same ones in FIGS. 15-18 will be given the same symbols as the latter and will be described in a simplified manner or will not be described at all, that is, only differences will be described.

A name display region 51, an order display region 52, a video display region SWD3, a manipulation region SWD4, and a "next" button 60 are arranged in the adjustment picture WD4. A bar in the order display region 52 indicates that Step 2 is being executed currently.

In the video display region SWD3, data of an image 58 taken by and transmitted from the vehicle shooting camera 10 are displayed together with grid-like adjustment guide lines KL1. For example, a video 58 taken from a gantry that is located above an expressway and to which the vehicle shooting camera 10 is attached is displayed. The setting terminal 30 displays the adjustment guide lines KL1 in such a manner that they are superimposed on the data of the image 58, to increase the operability of adjustment of the zoom position and the focusing positions by a worker.

A zoom position adjustment icon 59A and a focusing position adjustment icon 59B are displayed in the manipulation region SWD4. When a plus portion of the adjustment icon 59A is pushed, the zoom position is adjusted in a zoom-in direction (i.e., in a direction of increasing the zoom magnification). On the other hand, when a minus portion of the adjustment icon 59A is pushed, the zoom position is adjusted in a zoom-out direction (i.e., in a direction of decreasing the zoom magnification). Likewise, when a flower mark of the adjustment icon 59B is pushed, the focusing position is adjusted so that focusing is made on an object that is closer to the vehicle shooting camera 10 than the current subject is (autofocusing). On the other hand, when a mountain mark of the adjustment icon 59B is pushed, the focusing position is adjusted so that focusing is made on an object that is more distant from the vehicle shooting camera 10 than the current subject is (autofocusing). When a reset button RS1 is pushed by the worker, an instruction to reset the zoom position and the focusing position to positions at the time of the start of Step 1.

The "next" button 60 has a function of commanding the end of Step 2. If the "next" button 60 is pushed by a manipulation of the worker, the setting terminal 30 transmits a Step 2 end notice including camera parameters obtained by the camera parameters adjustment using at least one of the adjustment icons 59A and 59B to the vehicle shooting camera 10 via the access point UPDP1.

[Step 3: Calling of Attention to Removal of Access Point]

When receiving the Step 2 end notice (described above) from the setting terminal 30 via the access point UPDP1, the vehicle shooting camera 10 sets the adjusted camera parameters. As a result, the vehicle shooting camera 10 can perform capturing the camera parameters that reflect the zoom position and the focusing positions adjusted by the worker using the setting terminal 30. The setting terminal 30 displays an attention-calling picture WD5 for calling attention to removal of the access point UPDP1 being connected to the vehicle shooting camera 10 as Step 3 of the procedure for adjusting the zoom position and the focusing positions of the vehicle shooting camera 10, and thereby urges the worker to remove the access point UPDP1 (see FIG. 20).

Figure 20:
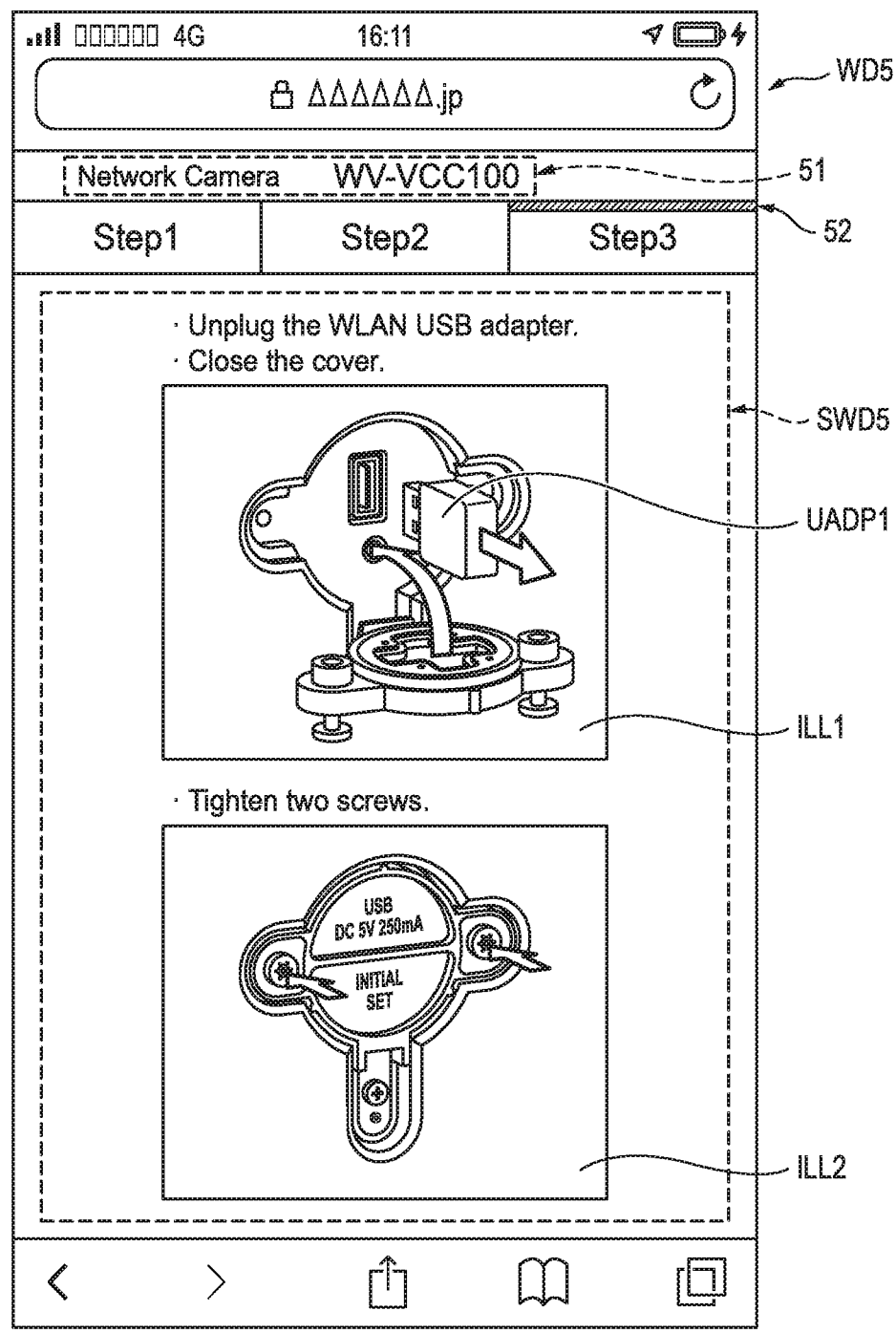
FIG. 20 shows an example attention-calling picture to be displayed on the setting terminal at Step 3 of the procedure for adjusting the zoom position and the focusing positions of the vehicle shooting camera.

FIG. 20 shows an example attention-calling picture WD5 to be displayed on the setting terminal 30 at Step 3 of the procedure for adjusting the zoom position and the focusing positions of the vehicle shooting camera 10. In descriptions that will be made with reference to FIG. 20, elements having the same ones in FIGS. 15-19 will be given the same symbols as the latter and will be described in a simplified manner or will not be described at all, that is, only differences will be described.

A name display region 51, an order display region 52, and an attention-calling display region SWD5 are arranged in the attention-calling picture WD5. A bar in the order display region 52 indicates that Step 3 is being executed currently.

An illustration ILL1 as an instruction to remove the access point UAPDP1 being connected to the back-body-side connector 41 of the vehicle shooting camera 10 and an illustration ILL2 as an instruction to perform screwing at two positions after removal of the access point UPDP1. As a result, the worker can remove the access point UAPDP1 and screw the back lid CV1 without failing to do so after the adjustment of the zoom position and the focusing positions of the vehicle shooting camera 10.

As described above, in the modified operation procedure for adjusting the zoom position and the focusing positions of the vehicle shooting camera 10, the connector 41 for the access point UADP1 for relaying a wireless communication between the vehicle shooting camera 10 and the setting terminal 30 is provided on the side of the body back surface of the vehicle shooting camera 10. The vehicle shooting camera 10 performs a wireless communication with the setting terminal 30 via the access point UADP1. With this measure, when initial settings of the vehicle shooting camera 10 are made (e.g., when the vehicle shooting camera 10 is attached to what is provided at an installation position), the access point UADP1 capable of relaying a wireless communication between the setting terminal 30 held by the worker and the vehicle shooting camera 10 can be attached in a simple manner, whereby the adjustment of the zoom position and the focusing positions of the vehicle shooting camera 10 using the setting terminal 30 is made more convenient.

The setting terminal 30 acquires, as the positional relationship information, an installation height of the vehicle shooting camera 10, a distance to the vehicle VCL2 in the horizontal direction, and a deflection distance that is a deviation, in the road width direction, of the vehicle shooting camera 10 from the running direction of the vehicle VCL2 that are input by manipulations of the worker, and transmits the positional relationship information to the vehicle shooting camera 10 via the access point UADP1.

With this measure, the worker can easily input positional relationship information that is necessary to calculate camera parameters of the vehicle shooting camera 10 and transmit it to the vehicle shooting camera 10.

The setting terminal 30 receives a video taken on the basis of the camera parameters derived by the vehicle shooting camera 10 from the vehicle shooting camera 10 via the access point UADP1, and displays the video. And the setting terminal 30 adjusts the zoom position and the focusing positions of the vehicle shooting camera 10 according to manipulations of the worker. With this measure, the worker can adjust the zoom position and the focusing positions to desired positions flexibly while seeing the video taken by the vehicle shooting camera 10 on the basis of the positional relationship information that was input by himself or herself and displayed on the display device (e.g., display/manipulation unit 34) of the setting terminal 30.

When detecting an end of the adjustment of the zoom position and the focusing positions, the setting terminal 30 displays a picture (e.g., attention-calling picture WD5) as an instruction to remove the access point UADP1. With this measure, the worker can remove the access point UADP1 and screw the back lid CV1 without failing to do so after adjusting the zoom position and the focusing positions of the vehicle shooting camera 10.

Although the embodiment has been described above with reference to the drawings, it goes without saying that the disclosure is not limited to this example. It is apparent that those skilled in the art could conceive various changes, modifications, replacements, additions, deletions, or equivalents within the confines of the claims, and they are construed as being included in the technical scope of the disclosure.

INDUSTRIAL APPLICABILITY

The present disclosure is useful when applied to camera parameter setting systems and camera parameter setting methods for assisting an operation of setting, properly in a short time, camera parameters to be used in the daytime and those to be used in the nighttime.

The present application is based upon Japanese Patent Application (Patent Application No. 2019-103275 filed on May 31, 2019), the content of which is incorporated herein by reference.

What is claimed is:

1. A camera parameter setting system, comprising:
   at least one camera; and
   a terminal that is communicably connected to the camera, wherein:
   in installation work, the camera captures a vehicle including an occupant and a license plate of the vehicle in a view angle from an installation position of the camera and transmits, to the terminal, a captured image of the occupant and a captured image of the license plate in response to a setting request from the terminal;
   the terminal displays a setting screen including the captured image of the occupant and the captured image of the license plate, receives input of parameters including an operation mode of the camera and positional relationship information indicating a positional relationship between the camera and the vehicle based on manipulations of an operator, and transmits the input parameters to the camera;
   the camera derives and sets camera parameters corresponding to the operation mode based on the input parameters transmitted from the terminal; and the terminal displays, on the setting screen, view angle adjustment guide lines in at least one of the captured image of the occupant and the captured image of the license plate in response to a manipulation of the operator.

2. The camera parameter setting system according to claim 1, wherein the camera further derives second camera parameters corresponding to another operation mode different from the operation mode based on the input parameters transmitted from the terminal and further sets the second camera parameters for the another operation mode.

3. The camera parameter setting system according to claim 2, wherein the operation mode is a daytime mode and the another operation mode is a nighttime mode.

4. The camera parameter setting system according to claim 2, wherein the operation mode is a nighttime mode and the another operation mode is a daytime mode.

5. The camera parameter setting system according to claim 2, wherein the camera comprises a lens block comprising at least a focusing lens and a memory that is configured to store focusing position information that correlates plural prescribed distances with respective focusing-attaining positions of the focusing lens in each of the daytime and the nighttime, and derives a position of the focusing lens corresponding to the operation mode and a position of the focusing lens corresponding to the another operation mode based on the focusing position information and a distance to a subject.

6. The camera parameter setting system according to claim 1, wherein:
the terminal transmits, to the camera, an adjustment request for adjusting a focusing position of the camera in response to a manipulation of the operator on the setting screen in which the captured image of the occupant, the captured image of the license plate, and the view angle adjustment guide lines are included; and
the camera changes and updates the focusing position in response to the adjustment request.

7. The camera parameter setting system according to claim 1, wherein:
the camera comprises a connector for an access point for relaying a wireless communication between the camera and the terminal disposed on a side of a body back surface of the camera; and
the camera performs the wireless communication with the terminal via the access point.

8. The camera parameter setting system according to claim 7, wherein the terminal acquires, as the positional relationship information, an installation height of the camera, a distance to the vehicle in the horizontal direction, and a deflection distance that is a deviation, in a road width direction, of the camera from a running direction of the vehicle that are input by the manipulations of the operator, and transmits the positional relationship information to the camera via the access point.

9. The camera parameter setting system according to claim 8, wherein the terminal receives, from the camera, a video taken based on the camera parameters derived by the camera, displays the video, and adjusts a zoom position and a focusing position of the camera based on the manipulations of the operator.

10. The camera parameter setting system according to claim 9, wherein, when detecting an end of an adjustment of the zoom position and the focusing position, the terminal displays a picture as an instruction to remove the access point.

11. A camera parameter setting method performed by a camera parameter setting system comprising at least one camera and a terminal that is communicably connected to the camera, the camera parameter setting method comprising:
in installation work, by the camera, capturing a vehicle including an occupant and a license plate of the vehicle in a view angle from an installation position of the camera and transmitting, to the terminal, at least one captured image of the occupant and the license plate in response to a setting request from the terminal;
by the terminal, displaying a setting screen including the at least one captured image of the occupant and of the license plate, receiving input of parameters including an operation mode of the camera and positional relationship information indicating a positional relationship between the camera and the vehicle based on manipulations of an operator, and transmitting the input parameters to the camera;
by the camera, deriving and setting camera parameters corresponding to the operation mode based on the input parameters transmitted from the terminal; and
by the terminal, displaying, on the setting screen, view angle adjustment guide lines in at least one of the at least one captured image of the occupant and the license plate in response to a manipulation of the operator.

12. A camera parameter setting system, comprising:
at least one camera; and
a terminal that is communicably connected to the camera, wherein:
in installation work, the camera captures a vehicle including an occupant and a license plate of the vehicle in a view angle from an installation position of the camera and transmits, to the terminal, a captured image of the occupant and a captured image of the license plate in response to a setting request from the terminal;
the terminal displays a setting screen including the captured image of the occupant and the captured image of the license plate, receives input of parameters including an operation mode of the camera and positional relationship information indicating a positional relationship between the camera and the vehicle based on manipulations of an operator, and transmits the input parameters to the camera;
the camera derives and sets first camera parameters corresponding to the operation mode based on the input parameters transmitted from the terminal;
the camera further derives second camera parameters corresponding to another operation mode different from the operation mode based on the input parameters transmitted from the terminal and further sets the second camera parameters for the another operation mode; and
the camera comprises a lens block comprising at least a focusing lens and a memory that is configured to store focusing position information that correlates plural prescribed distances with respective focusing-attaining positions of the focusing lens in each of daytime and nighttime, and derives a position of the focusing lens corresponding to the operation mode and a position of the focusing lens corresponding to the another operation mode based on the focusing position information and a distance to a subject.

13. A camera parameter setting system, comprising:
at least one camera; and
a terminal that is communicably connected to the camera, wherein:
in installation work, the camera captures a vehicle including an occupant and a license plate of the vehicle in a view angle from an installation position of the camera and transmits, to the terminal, a captured image of the occupant and a captured image of the license plate in response to a setting request from the terminal;
the terminal displays a setting screen including the captured image of the occupant and the captured image of the license plate, receives input of parameters including an operation mode of the camera and positional relationship information indicating a positional relationship between the camera and the vehicle based on manipulations of an operator, and transmits the input parameters to the camera;
the camera derives and sets camera parameters corresponding to the operation mode based on the input parameters transmitted from the terminal;
the camera comprises a connector for an access point for relaying a wireless communication between the camera and the terminal disposed on a side of a body back surface of the camera;
the camera performs the wireless communication with the terminal via the access point; and
the terminal acquires, as the positional relationship information, an installation height of the camera, a distance to the vehicle in the horizontal direction, and a deflection distance that is a deviation, in a road width direction, of the camera from a running direction of the vehicle that are input by the manipulations of the operator, and transmits the positional relationship information to the camera via the access point.

14. A camera parameter setting system, comprising:
at least one camera; and
a terminal that is communicably connected to the camera, wherein:
in installation work, the camera captures a vehicle including an occupant and a license plate of the vehicle in a view angle from an installation position of the camera and transmits, to the terminal, at least one captured image of the occupant and the license plate in response to a setting request from the terminal;
the terminal displays a setting screen including the at least one captured image of the occupant and the license plate, receives input of parameters including an operation mode of the camera and positional relationship information indicating a positional relationship between the camera and the vehicle based on manipulations of an operator, and transmits the input parameters to the camera;
the camera derives and sets camera parameters corresponding to the operation mode based on the input parameters transmitted from the terminal; and
the terminal displays, on the setting screen, view angle adjustment guide lines in at least one of the at least one captured image of the occupant and the license plate in response a manipulation of the operator.

15. A camera parameter setting system, comprising:
at least one camera; and
a terminal that is communicably connected to the camera, wherein:
in installation work, the camera captures a vehicle including an occupant and a license plate of the vehicle in a view angle from an installation position of the camera and transmits, to the terminal, at least one captured image of the occupant and the license plate in response to a setting request from the terminal;
the terminal displays a setting screen including the at least one captured image of the occupant and the license plate, receives input of parameters including an operation mode of the camera and positional relationship information indicating a positional relationship between the camera and the vehicle based on manipulations of an operator, and transmits the input parameters to the camera;
the camera derives and sets first camera parameters corresponding to the operation mode based on the input parameters transmitted from the terminal;
the camera further derives second camera parameters corresponding to another operation mode different from the operation mode based on the input parameters transmitted from the terminal and further sets the second camera parameters for the another operation mode; and
the camera comprises a lens block comprising at least a focusing lens and a memory that is configured to store focusing position information that correlates plural prescribed distances with respective focusing-attaining positions of the focusing lens in each of daytime and nighttime, and derives a position of the focusing lens corresponding to the operation mode and a position of the focusing lens corresponding to the another operation mode based on the focusing position information and a distance to a subject.

* * * * *